(12) United States Patent
Yoshii et al.

(10) Patent No.: US 12,367,115 B2
(45) Date of Patent: Jul. 22, 2025

(54) STORAGE SYSTEM

(71) Applicant: Hitachi, Ltd., Tokyo (JP)

(72) Inventors: Yoshihiro Yoshii, Tokyo (JP);
Tomohiro Yoshihara, Tokyo (JP);
Ryosuke Tatsumi, Tokyo (JP)

(73) Assignee: HITACHI VANTARA, LTD., Yokohama (JP)

( * ) Notice: Subject to any disclaimer, the term of this patent is extended or adjusted under 35 U.S.C. 154(b) by 76 days.

(21) Appl. No.: 18/114,468

(22) Filed: Feb. 27, 2023

(65) Prior Publication Data
US 2024/0111640 A1 Apr. 4, 2024

(30) Foreign Application Priority Data
Sep. 30, 2022 (JP) .................................. 2022-157573

(51) Int. Cl.
*G06F 11/00* (2006.01)
*G06F 11/07* (2006.01)
*G06F 11/16* (2006.01)

(52) U.S. Cl.
CPC ...... *G06F 11/1658* (2013.01); *G06F 11/0763* (2013.01)

(58) Field of Classification Search
CPC ............. G06F 11/1658; G06F 11/0763; G06F 11/2089
See application file for complete search history.

(56) References Cited

U.S. PATENT DOCUMENTS

| | | | |
|---|---|---|---|
| 6,675,258 B1 * | 1/2004 | Bramhall | G06F 11/1433 714/E11.135 |
| 9,098,211 B1 | 8/2015 | Madnani et al. | |
| 9,959,043 B2 | 5/2018 | Cao et al. | |
| 10,185,639 B1 * | 1/2019 | Chatterjee | G06F 11/2092 |
| 11,327,655 B2 * | 5/2022 | Kirkpatrick | G06F 16/1837 |
| 2003/0037282 A1 * | 2/2003 | Berg | G06F 11/2089 714/11 |
| 2010/0199272 A1 * | 8/2010 | Mahajan | G06F 8/656 717/171 |
| 2012/0173953 A1 * | 7/2012 | Flynn | G06F 8/654 717/170 |
| 2017/0242771 A1 * | 8/2017 | Khemani | G06F 16/22 |
| 2018/0032261 A1 * | 2/2018 | Singhai | G06F 12/023 |
| 2019/0377684 A1 * | 12/2019 | Saito | G06F 3/0619 |
| 2022/0326869 A1 * | 10/2022 | Tatsumi | G06F 3/0604 |

* cited by examiner

*Primary Examiner* — Philip Guyton
(74) *Attorney, Agent, or Firm* — MATTINGLY & MALUR, PC

(57) ABSTRACT

Each controller of a plurality of storage controllers is an old storage controller before replacement or a new storage controller after replacement. The new storage controller can execute a first program and a second program, and the old storage controller can execute at least the second program. When all of the plurality of storage controllers are the new storage controller, the new storage controller processes data input and output to and from the storage drive by using the first program. When the plurality of storage controllers includes at least one of the old storage controllers, each storage controller of the plurality of storage controllers processes the data input and output to and from the storage drive by using the second program.

7 Claims, 17 Drawing Sheets

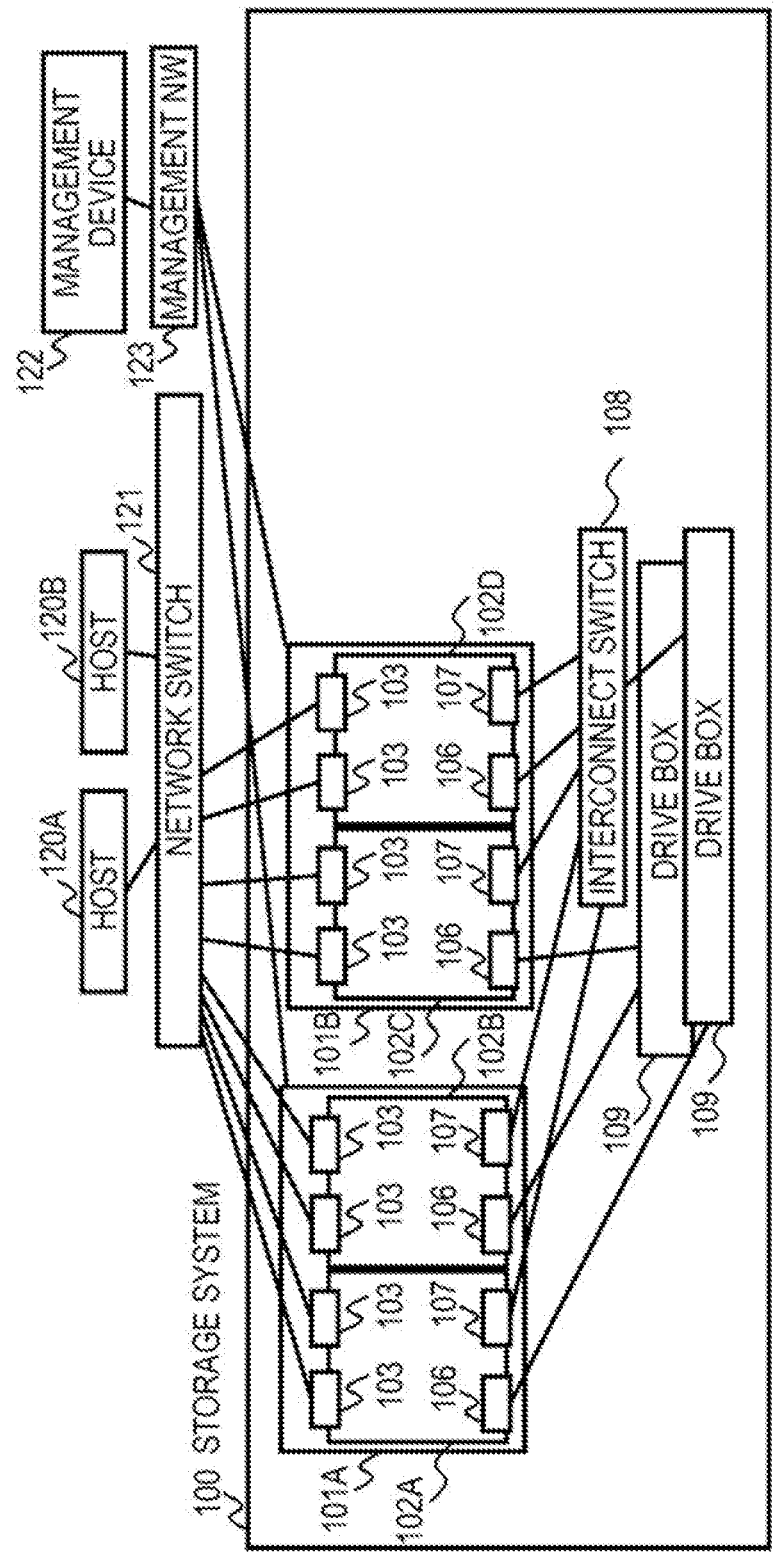

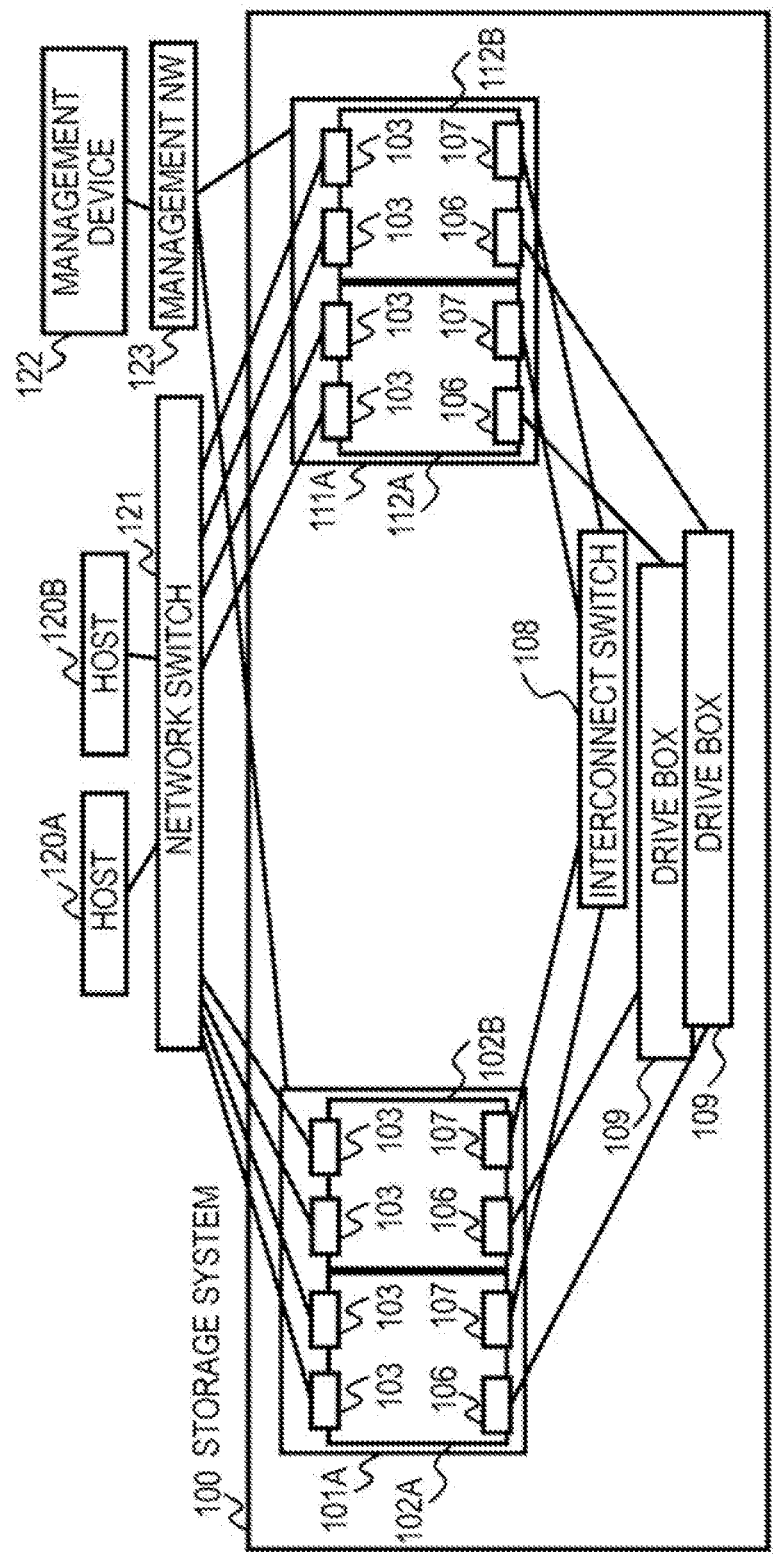

DURING UPGRADE OF STORAGE NODE 101A

AFTER UPGRADE OF STORAGE NODE 101A

LOGICAL-TO-PHYSICAL ADDRESS MANAGEMENT TABLE

| LOGICAL ADDRESS | DRIVE NUMBER | PHYSICAL ADDRESS | POST-COMPRESSION SIZE | OFFSET |
|---|---|---|---|---|
| 0x00000000 | 0 | 0x00001000 | 16KB | 0KB |
| 0x00000004 | 0 | 0x00001000 | 16KB | 4KB |
| 0x00000008 | 0 | 0x00001014 | 20KB | 0KB |
| 0x0000000c | 0 | 0x00001010 | UNCOMPRESSED | - |
| : | | | | |
| 0x00001000 | 0 | 0x00001000 | 16KB | 8KB |
| 0x00001004 | 0 | 0x00001000 | 16KB | 12KB |
| : | | | | |

FIG. 9

MOUNTED SOFTWARE MANAGEMENT INFORMATION 606

| CONTROLLER ID (6061) | SOFTWARE TYPE (6062) | SOFTWARE SUB-TYPE (6063) | SOFTWARE VERSION INFORMATION (6064) |
|---|---|---|---|
| 0x00 | NON-STOP CONTROLLER UPDATE SEQUENCE CONTROL UNIT | - | 10.0.0 |
| | COMPRESSION / DECOMPRESSION PROCESSING PROGRAM | SOFTWARE METHOD | 10.0.0 |
| | | ACCELERATOR METHOD 1 | 10.0.0 |
| | ... | ... | ... |
| 0x01 | NON-STOP CONTROLLER UPDATE SEQUENCE CONTROL UNIT | - | 10.0.0 |
| | COMPRESSION / DECOMPRESSION PROCESSING PROGRAM | SOFTWARE METHOD | 10.0.0 |
| | | ACCELERATOR METHOD 1 | 10.0.0 |
| | ... | ... | ... |
| ... | ... | ... | ... |

FIG. 10

SOFTWARE COMPATIBILITY MANAGEMENT INFORMATION 607

| SOFTWARE TYPE 6071 | SOFTWARE SUB-TYPE 6072 | SOFTWARE VERSION INFORMATION 6073 | SOFTWARE COMPATIBILITY INFORMATION 6074 | | |
|---|---|---|---|---|---|
| | | | CONTROLLER VERSION 1 (NO ACCELERATOR) | CONTROLLER VERSION 2 (WITH ACCELERATOR METHOD 1 INSTALLED) | CONTROLLER VERSION 3 (WITH ACCELERATOR METHOD 2 MOUNTED) |
| NON-STOP CONTROLLER UPDATE SEQUENCE CONTROL UNIT | | 10.0.0 | N/A | SUPPORT UPDATE FROM CONTROLLER VERSION 1 | N/A |
| | | 11.0.0 | N/A | SUPPORT UPDATE FROM CONTROLLER VERSION 1 | SUPPORT UPDATE FROM CONTROLLER VERSIONS 1 AND 2 |
| COMPRESSION / DECOMPRESSION PROCESSING PROGRAM | SOFTWARE METHOD 1 | 10.0.0 | SUPPORT (MIDDLE PERFORMANCE INFLUENCE) | SUPPORT (MIDDLE PERFORMANCE INFLUENCE) | N/A |
| | | 11.0.0 | SUPPORT (MIDDLE PERFORMANCE INFLUENCE) | SUPPORT (MIDDLE PERFORMANCE INFLUENCE) | SUPPORT (MIDDLE PERFORMANCE INFLUENCE) |
| | ACCELERATOR METHOD 1 | 10.0.0 | N/A | SUPPORT (SMALL PERFORMANCE INFLUENCE) | N/A |
| | | 11.0.0 | SUPPORT (LARGE PERFORMANCE INFLUENCE) | SUPPORT (SMALL PERFORMANCE INFLUENCE) | SUPPORT (LARGE PERFORMANCE INFLUENCE) |
| | ACCELERATOR METHOD 2 | 10.0.0 | N/A | N/A | N/A |
| | | 11.0.0 | SUPPORT (LARGE PERFORMANCE INFLUENCE) | SUPPORT (LARGE PERFORMANCE INFLUENCE) | SUPPORT (SMALL PERFORMANCE INFLUENCE) |
| ... | ... | ... | ... | ... | ... |

STORAGE CONTROLLER UPGRADE OVERALL SEQUENCE

STORAGE SYSTEM

CLAIM OF PRIORITY

The present application claims priority from Japanese patent application JP 2022-157573 filed on Sep. 30, 2022, the content of which is hereby incorporated by reference into this application.

BACKGROUND OF THE INVENTION

1. Field of the Invention

The present invention relates to storage controller replacement in a storage system.

2. Description of Related Art

In recent years, large amounts of data are stored in a storage system due to an increase in capacity of a NAND flash memory. In addition, the storage system is required to be able to replace hardware and software with the latest ones without affecting operations of high-order applications. Generally, replacement of the storage system requires time for setting of a new storage system side and a data transfer process.

U.S. Pat. No. 9,959,043B discloses an invention for updating software of a storage system in a non-stop manner. After updating software, both a new data format and an old data format are present, and thus, new data contains references to data in the old data format. By writing the data in the new data format when the data is updated, update to the new data format can be performed without stopping reading and writing of the data.

U.S. Pat. No. 9,098,211B discloses an invention for transferring data in a non-stop manner between a plurality of storage systems. In order to allow a host to recognize a single storage system, the storage system is configured with a virtual storage system, virtual ports, and a virtual logical unit (LUN) spanning a plurality of storages. By associating the port name and the port address of the physical port of the transfer source with the virtual port name and the port address of the transfer destination system, the transfer to the new storage system can be completed in a non-stop manner.

In a storage system of a dual controller, there is a method for updating hardware of the storage system in a non-stop manner. According to the method, update to a new controller can be performed without moving the data in the connected drive. In addition, configuration information and the like of the storage system is maintained. By replacing the storage controllers one by one in order, replacement with new hardware is implemented. This is a general method as a controller replacing procedure in the storage system.

In U.S. Pat. No. 9,959,043B, when a data format is updated for each piece of data in a logical volume, by having a reference to old data from a new data format, new software copes with the new data format while the old data format is maintained.

However, in upgrade of a storage controller in a storage system, due to differences in hardware components of a hardware storage controller and specifications of the storage system, there is a control logic that starts to be applied after the upgrade of the storage controller is completed. For example, in some cases, a new storage controller may be provided with a powerful CPU and a hardware offload engine, and more computationally expensive data encryption and data compression algorithms can be adopted. In the specification of U.S. Pat. No. 9,959,043B, a method of determining start of the application of the control logic is not disclosed.

SUMMARY OF THE INVENTION

A technology of suppressing influence of redundancy and performance degradation when updating hardware and software of a storage system in a non-stop manner is desired.

According to one aspect of the invention, there is provided a storage system including: a plurality of storage controllers including processors and memories and processing data input and output to and from a storage drive, in which each controller of the plurality of storage controllers is an old storage controller before replacement or a new storage controller after replacement, in which the new storage controller can execute a first program and a second program, in which the old storage controller can execute at least the second program, in which, when all of the plurality of storage controllers are the new storage controller, the new storage controller processes the data input and output to and from the storage drive by using the first program, and in which, when the plurality of storage controllers includes at least one of the old storage controllers, each storage controller of the plurality of storage controllers processes the data input and output to and from the storage drive by using the second program.

According to one aspect of the invention, in a multi-controller storage system, update to new hardware and new software can be performed in a non-stop manner by suppressing influence of redundancy and performance degradation.

BRIEF DESCRIPTION OF THE DRAWINGS

FIG. 2A is an explanatory diagram illustrating an overview of a procedure for upgrade of storage controllers when the number of storage controllers in the embodiment is less than the maximum number of storage systems;

FIG. 2C is an explanatory diagram illustrating an overview of the procedure for upgrade of the storage controllers when the number of storage controllers in the embodiment is less than the maximum number of storage systems;

FIG. 9 is an explanatory diagram illustrating software compatibility management information stored in the memory of the storage controller in the embodiment;

FIG. 10 is a flowchart illustrating an overall controller update process executed by the storage controller in the embodiment;

DESCRIPTION OF EMBODIMENTS

Figure 1:
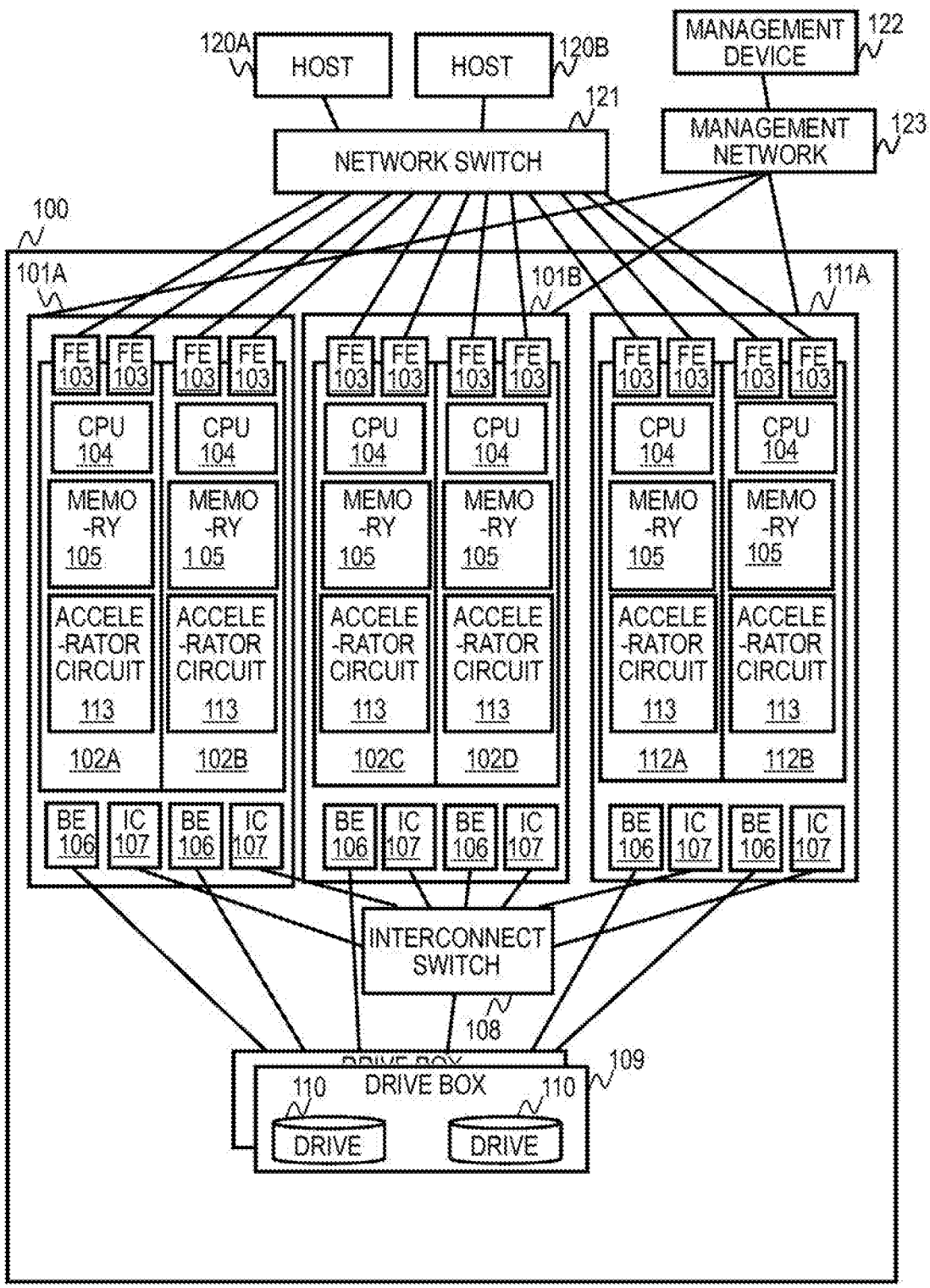
FIG. 1 is a block diagram illustrating a configuration of a storage system in an embodiment.

An embodiment of the invention will be described below with reference to the drawings. In the accompanying drawings, in some cases, functionally identical elements may be displayed by the same numerals. The accompanying drawings illustrate specific aspects and embodiments based on principles of the invention. These aspects and embodiments are provided for the better understanding of the invention and are not to be used for limitative interpretation of the invention.

Furthermore, as described below, embodiments of the invention may be implemented in software running on a general-purpose computer, may be implemented in dedicated hardware, or may be implemented in a combination of software and hardware.

In the following, in some cases, each process in the embodiment of the invention may be described with a "program" as a subject (subject of an operation). Since the program is executed by a processor to perform a predetermined process while using a memory and a communication port (communication control device), it may be assumed that the description is performed by using the processor as a subject. A portion or all of the program may be implemented by dedicated hardware or may be modularized. Various programs may be installed in each computer by a program distribution server or a storage medium.

In the description below, an interface may include at least one of a user interface and a communication interface. The user interface may include at least one I/O device among one or more I/O devices (for example, an input device (for example, a keyboard and a pointing device) and an output device (for example, a display device)) and a display calculator.

The communication interface may include one or more communication interface devices. The one or more communication interface devices may be one or more of the same types of communication interface devices (for example, one or more NICs (Network Interface Cards)) or may be two or more different types of communication interface devices (for example, the NIC and an HBA (Host Bus Adapter)).

In addition, in the following description, the memory includes one or more memory devices. The memory may be a volatile memory or may be a non-volatile memory. The memory is mainly used during processing by the processor.

In addition, in the following description, the processor includes one or more processor devices. The processor device is typically a CPU (Central Processing Unit).

In addition, in the following description, an "accelerator" includes one or more hardware integrated circuits. At least one hardware integrated circuit is typically an FPGA (Field Programmable Gate Array).

In addition, in the following description, information may be described using an expression such as an "xxx table", but the information may be expressed in any data structure. That is, the "xxx table" can be referred to as "xxx information" in order to indicate that the information does not depend on the data structure. In addition, in the following description, the configuration of each table is an example, one table may be divided into two or more tables, and all or a portion of two or more tables may be one table.

In addition, in the following description, when describing the same type of elements without distinguishing the same type of elements, the common numerals among the reference numerals are used, and when distinguishing the same type of elements, the reference numerals or IDs of the elements (for example, Identification Numbers) may be used. For example, when a plurality of storage controllers are not distinguished, the storage controllers are described as a "storage controller 102", and when each storage controller is distinguished, the storage controllers are described as a "storage controller 102A" and a "storage controller 102B".

The same is applied to other elements (for example, a storage node 101, a frontend network port 103, a CPU (Central Processing Unit) 104, a memory 105, a backend network port 106, an interconnect network port 107, a drive box 109, a host computer 120, and the like).

In addition, in the following description, a storage system may include one or more storage devices. At least one storage device may be a general-purpose physical computer. In addition, at least one storage device may be a virtual storage device, or may execute SDx (Software-Defined anything). As the SDx, for example, an SDS (Software Defined Storage) (an example of the virtual storage device) or an SDDC (Software-Defined Datacenter) can be adopted.

There are several problems when updating hardware and software of the storage system in a non-stop manner. The first problem is that, in the storage system, in a state where an old storage controller does not exist, a control logic that cannot operate with the old storage controller is required to be operated with a new storage controller. Specifically, regardless of how many the storage controllers exist in the storage system, the control logic needs to be switched after the upgrade of all the storage controllers to the new storage controller is completed. Herein, the control logic is hardware or a combination of hardware and software that performs the process according to a specific algorithm for control of the storage system.

The second problem is that, even when the control logic in the storage system is functionally compatible between the old storage controller and the new storage controller, in some cases, the performance may change depending on the hardware version, and thus, there is a possibility of degradation in processing performance.

For example, with respect to the logic of the data compression/decompression algorithm installed in the new storage controller, the compression and decompression can be performed at high speed by using an accelerator circuit installed on the new storage controller, but since the accelerator circuit is not installed on the old storage controller, there may be a case where the CPU processing load is high when the data is read, and the performance is degraded.

A specific example in which this characteristic becomes a problem will be provided. After expanding the new storage controller, when a failure occurs in the new storage controller while switching the control logic to reduce the old storage controller, the state before the update needs to be restored.

In this case, when the new controller uses an accelerator to read the compressed data until a failure occurs, the old storage controller that does not have an accelerator needs to decompress the data by software to read the data, and thus, there is a problem that the data read throughput from a host computer deteriorates significantly.

In addition, when at least one normal new storage controller remains in the storage system, by adopting the method of transforming the old storage controller into a format that can be read at high speed and reducing the old storage controller before reducing the new storage controller, degradation in reading performance from the host computer can be prevented. However, in this case, the storage system cannot be returned to the state before the update until the transformation is completed, and thus, there is a problem that it takes time to recover from the failure.

In a multi-controller storage system configuration after expanding the new storage controller according to one embodiment of the present specification, the new storage software operating in the new storage controller and the old software operating in the old storage controller access common control information transparently via a network between the storage controllers. In addition, in the process performed by communication between the storage controllers, the software on the new storage controller operates so as to satisfy compatibility with the software on the old storage controller.

By doing so, each process performed by the storage system can be performed by either the old storage controller or the new storage controller, and switching can be performed so that each process can be performed by the new storage controller without stopping I/O.

In addition, cases of performing maintenance during the upgrade, cases of interrupting and returning to the original state, and the like can be flexibly and quickly coped with. At the same time, the configuration information such as LUN (Logical Unit Number) that is set before the update, the state of replication, and the like, and the access frequency information used for tiering and the like of storage media can be taken over as it is in the process performed by the new controller.

In one embodiment of the present specification, the old storage controller in the storage system is replaced with the new storage controller. The new storage controller can execute the first program and the second program, and the old storage controller can execute at least the second program.

Before the replacement of all the storage controllers in the storage system is completed, the new storage controller and the old storage controller process the data input and output to and from a storage drive by the second program, and after the replacement is completed, the new storage controller processes the data input and output to and from the storage drive by the first program instead of the second program. Accordingly, degradation in processing performance of the storage system can be suppressed.

FIG. 1 is a block diagram illustrating a configuration of the storage system in one embodiment of the present specification. A storage system 100 of the present embodiment has the plurality of storage controllers 102 and 112, one or more interconnect switches 108 and one or more the drive boxes 109. FIG. 1 illustrates storage controllers 102A to 102D and 112A and 112B as examples of the plurality of storage controllers 102 and 112.

Among the storage controllers, the storage controllers 102A to 102D are the old storage controllers that are reduced from now on. The storage controllers 102A and 102B are included in one storage node 101A, and the storage controllers 102C and 102D are included in another storage node 101B. On the other hand, the storage controllers 112A and 112B are the expanded new storage controllers and are included in one storage node 111A.

The old storage controller 102 to be reduced includes the CPU 104, the memory 105, the frontend network port (hereinafter also referred to as an FE port) 103, the backend network port (hereinafter also referred to as a BE port) 106, and the interconnect network port (hereinafter also referred to as an IC port) 107. The new storage controller 112 to be expanded in the same manner includes the CPU 104, the memory 105, the FE port 103, the BE port 106, and the IC port 107.

In the example of FIG. 1, although one storage controller 102 has one CPU 104, one memory 105, two FE ports 103, one BE port 106, and one IC port 107, the number of components is exemplary and the actual number of the components is any number. Similarly, the actual number of components for the storage controller that is an expansion target is also any number. In addition to these components, a hardware offload engine such as an FPGA may be installed.

The FE port 103 is connected to a network switch 121. The network switch 121 is connected to one or more host computers 120 (host computers 120A and 120B in the example of FIG. 1). The storage controller 102 receives commands such as writing and reading of user data from the host computer 120 through the FE port 103 and the network switch 121 and returns responses thereto. The same is applied to the storage controller 112.

The BE port 106 is connected to the drive box 109. The storage controller 102 performs writing and reading of the user data to and from the drive box 109 through the BE port 106. The same is applied to the storage controller 112.

The drive box 109 includes one or more storage drives (also referred to simply as a drive) 110 storing data written by the host computer 120. Each drive 110 includes a storage medium. The storage medium may be, for example, a high-capacity non-volatile storage medium such as a magnetic disk or a flash memory. A typical example of the drive 110 is a hard disk drive, an SSD (Solid State Drive), or the like.

the IC port 107 is connected to the interconnect switch 108. The interconnect switch 108 is connected to the IC port 107 of each of the storage controllers 102 and 112. The storage controller 102 can communicate with other storage controllers 102 in the storage system 100 through the IC port 107 and the interconnect switch 108 to transmit and receive, for example, the control information. The same is applied to the communication between the storage controllers 102 and 112, and the same is also applied to the communication between the storage controllers 112.

The CPU 104 is an arithmetic unit that implements various functions of the storage controllers 102 and 112 by executing the programs stored in the memory 105. Details of functions implemented by the CPU 104 will be described later.

The memory 105 includes an area for storing programs executed by the CPU 104, an area for storing control information of the storage controllers 102 and 112, an area for storing the data to be written or read by the host computer 120, and the like. Details of these areas will be described later.

An accelerator circuit 113 is a dedicated circuit for offloading various functions on the storage controllers 102 and 112 from the CPU 104. The accelerator circuit 113 is implemented as a dedicated circuit such as an FPGA or an ASIC. Examples of an offloading process include a data compression and decompression process, an encryption process, a data hash calculation process, and the like. By performing a process such as compression and decompression of host data by using the accelerator circuit, a high compression ratio can be implemented, and the load on the CPU 104 can be reduced.

Furthermore, each of the storage controllers 102 and 112 is connected to a management device 122 through a management network 123. It is noted that, in FIG. 1, for ease of description, hardware elements with the same names in the storage controllers 102 and 112 are denoted by the same reference numerals. However, between the storage controllers 102 and 112, hardware elements with the same names and the same reference numerals may have different configurations. For example, the accelerator circuits 113 of the storage controllers 102 and 112 may perform different processes.

Next, a procedure for upgrade of the storage controller 102 will be described with reference to FIGS. 2A to 2E. FIGS. 2A to 2E are explanatory diagrams illustrating an overview of a procedure for upgrade of the storage controllers when the number of storage controllers is less than the maximum number of storage systems.

FIG. 2A illustrates the storage system 100 before the upgrade of the storage controller 102 is started. At this time, the storage system 100 includes the old storage controllers 102A to 102D and does not have the new storage controllers 112A and 112B. At this time, redundancy is ensured by the four storage controllers 102A to 102D.

Figure 2B:
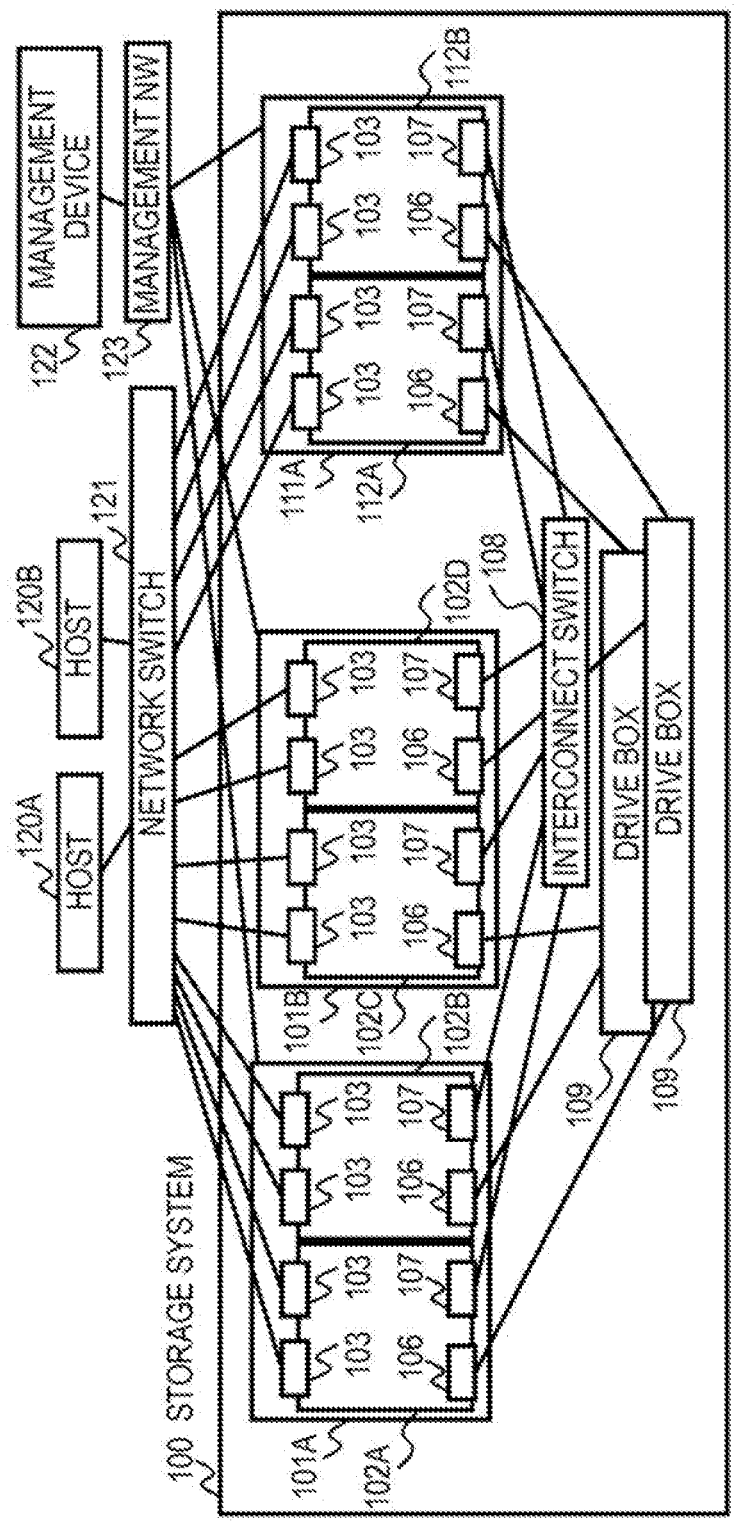
FIG. 2B is an explanatory diagram illustrating an overview of the procedure for upgrade of the storage controllers when the number of storage controllers in the embodiment is less than the maximum number of storage systems.

FIG. 2B illustrates the storage system 100 after expanding the new storage node 111A when the upgrade of the storage node 101B is being performed. The new storage node 111A includes the new storage controllers 112A and 112B. At this time, the storage system 100 includes the expanded new storage controllers 112A and 112B in addition to the old storage controllers 102A to 102D. At this time, redundancy is ensured by the six storage controllers 102A to 102D, 112A, and 112B.

FIG. 2C illustrates the storage system 100 after the upgrade of the storage node 101B is ended. At this time, the old storage node 101B, that is, the old storage controllers 102C and 102D are already reduced, and thus, the storage system 100 includes the old storage controllers 102A and 102B and the new storage controllers 112A and 112B. At this time, redundancy is ensured by the four storage controllers 102A, 102B, 112A, and 112B.

Figure 2D:
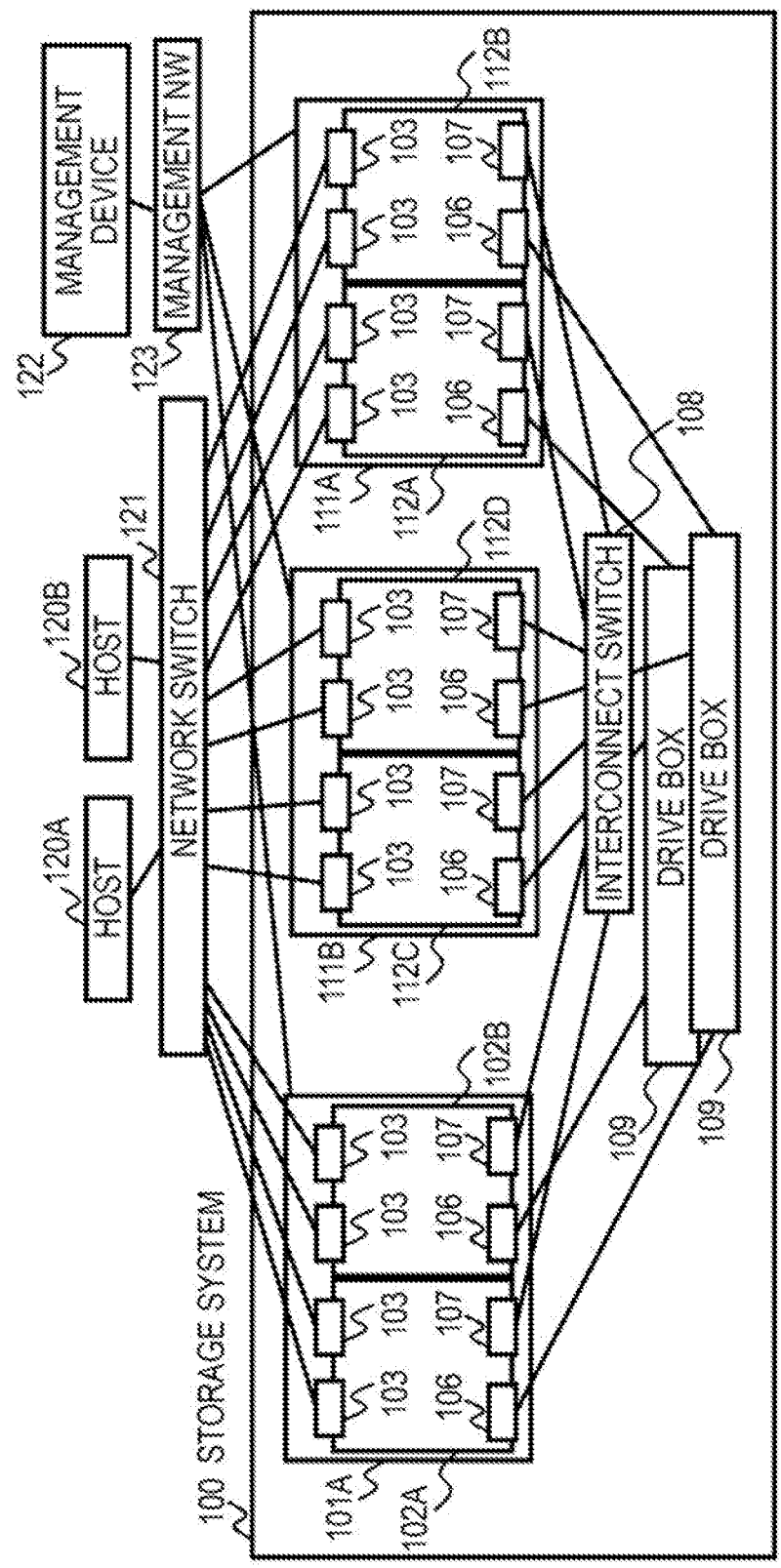
FIG. 2D is an explanatory diagram illustrating an overview of the procedure for upgrade of the storage controllers when the number of storage controllers in the embodiment is less than the maximum number of storage systems.

FIG. 2D illustrates the storage system 100 after expanding a new storage node 111B when the upgrade of the storage node 101A is being performed. The new storage node 111B includes new storage controllers 112C and 112D. At this time, the storage system 100 includes the expanded new storage controllers 112A to 112D in addition to the old storage controllers 102A and 102B. At this time, redundancy is ensured by the six storage controllers 102A, 102B, and 112A to 112D.

Figure 2E:
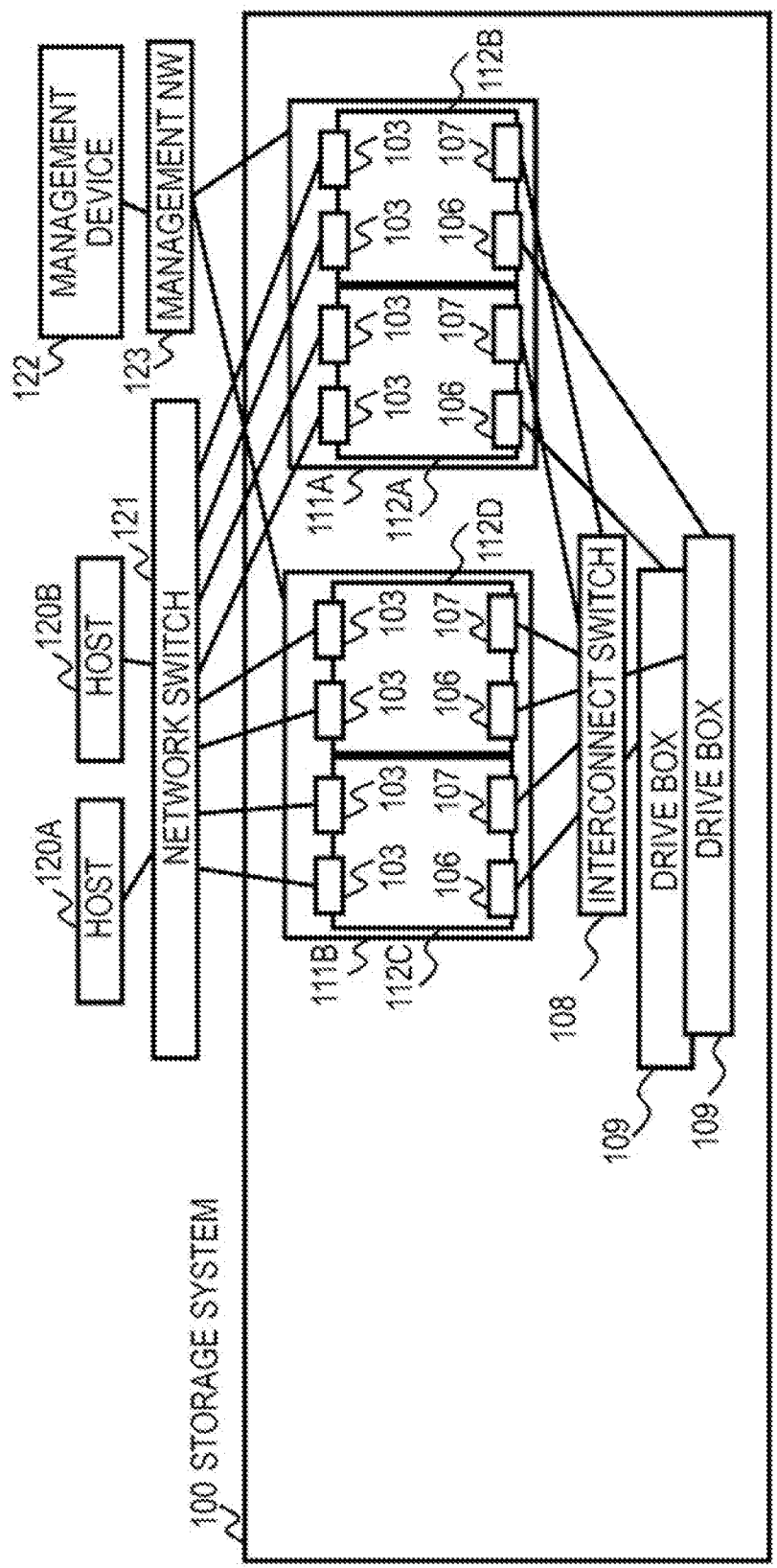
FIG. 2E is an explanatory diagram illustrating an overview of the procedure for upgrade of the storage controllers when the number of storage controllers in the embodiment is less than the maximum number of storage systems.

FIG. 2E illustrates the storage system 100 after the upgrade of the storage node 101A is ended. At this time, the old storage node 101A, that is, the old storage controllers 102A and 102B are already reduced, and the storage system 100 includes the new storage controllers 112A to 112D. At this time, redundancy is ensured by the four storage controllers 112A to 112D.

When a failure occurs during the update, the initial state can be restored by performing the operation in reverse order of the upgrade procedure.

Figure 3:
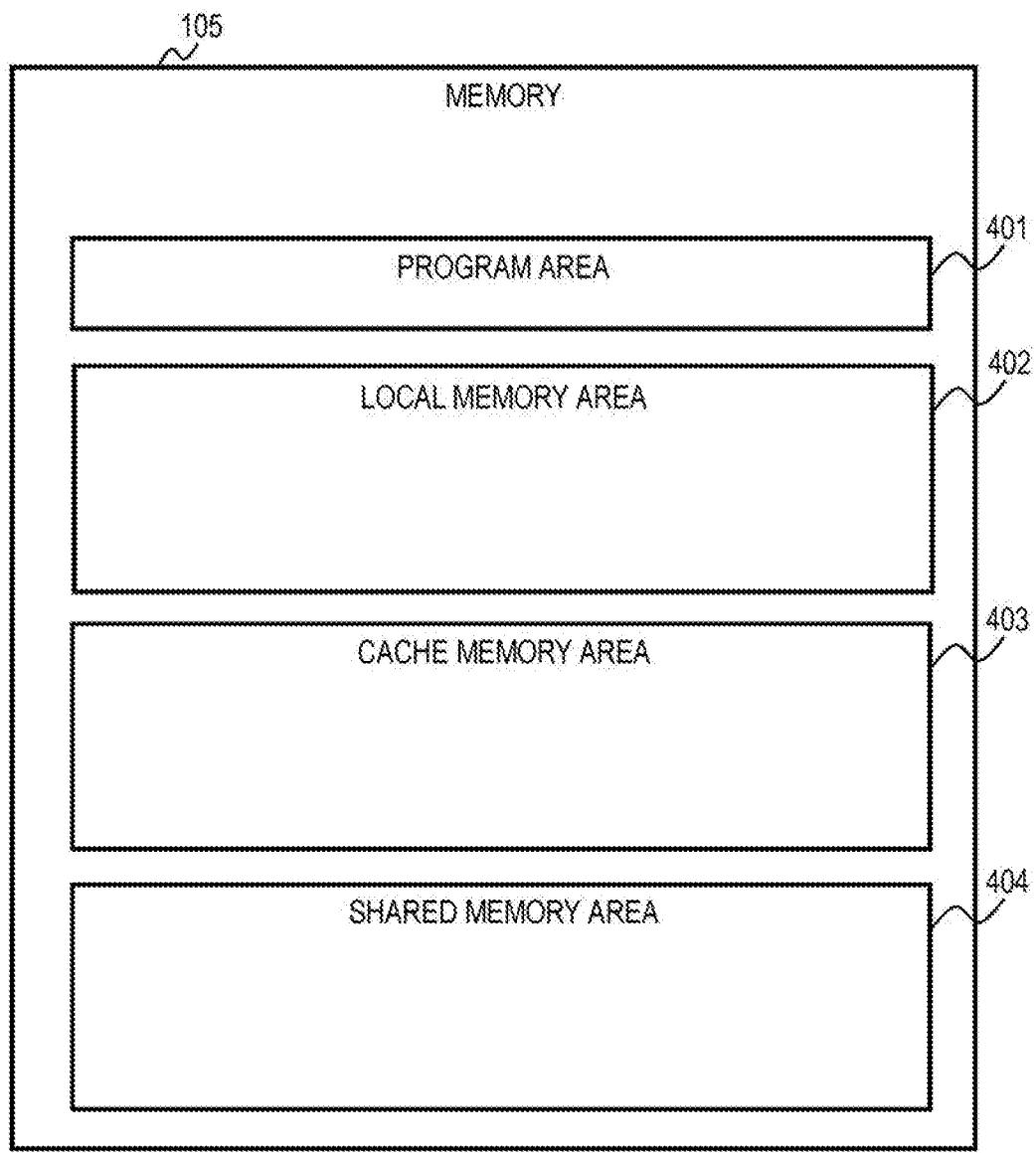
FIG. 3 is an explanatory diagram illustrating a configuration of a memory of the storage controller in the embodiment.

FIG. 3 is an explanatory diagram illustrating a configuration example of the memory 105 of the storage controllers 102 and 112 in the embodiment.

The memory 105 includes a program area 401, a local memory area 402, a cache memory area 403, and a shared memory area 404 as storage areas. The program area 401 stores control programs executed by the CPUs 104 in the storage controllers 102 and 112. The local memory area 402 includes a memory area for temporary use when the control program is executed and an area for storing a copy of the control information contained in the shared memory area 404.

The cache memory area 403 is an area for temporary storage of data (also called host data or user data) written from the host computer 120 and data read by the host computer 120. The shared memory area 404 contains information about the storage system 100 used by the control program. The shared memory area 404 is unique information shared by all the storage controllers 102 and 112 and may be stored across the plurality of storage controllers 102 and 112. In addition, the shared memory area 404 may be redundant among the plurality of storage controllers due to failure tolerance of the storage controllers 102 and 112 and the memory 105.

Figure 4:
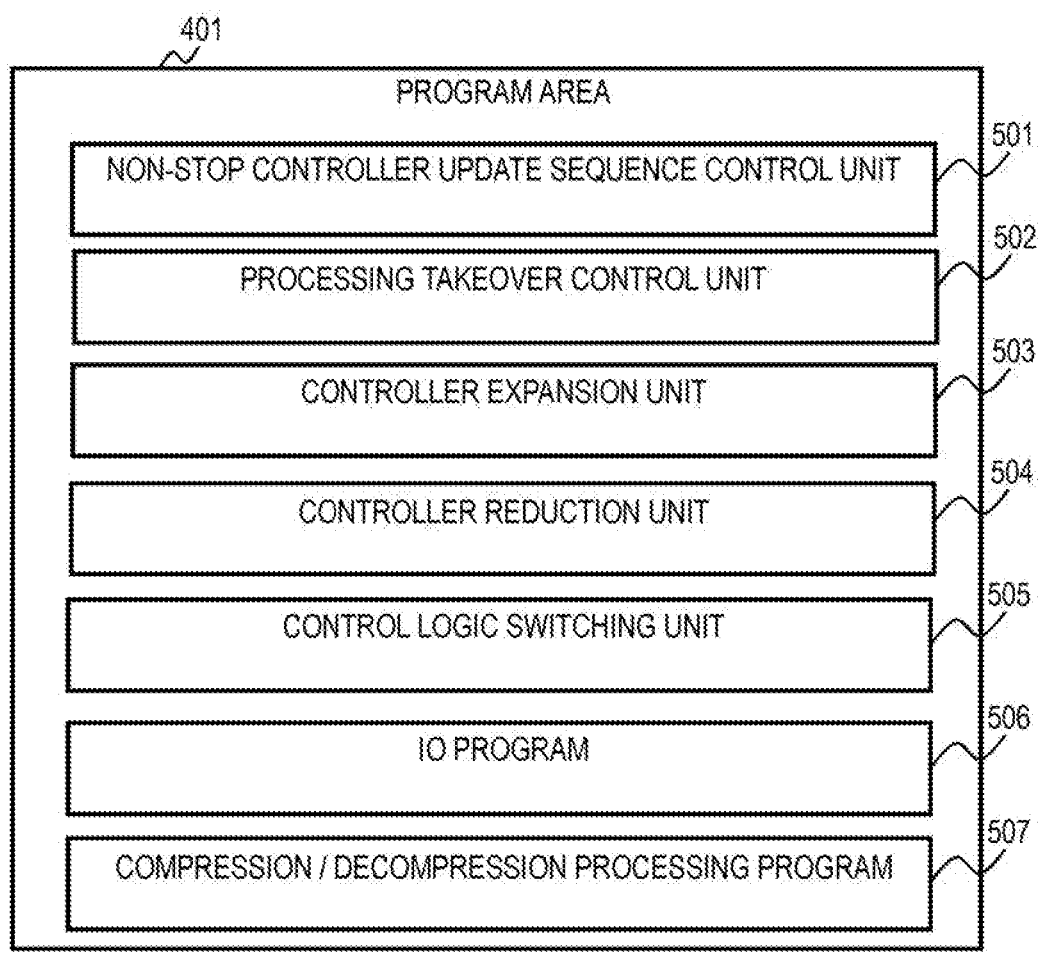
FIG. 4 is an explanatory diagram illustrating a configuration of a program area within the memory of the storage controller in the embodiment.

FIG. 4 is an explanatory diagram illustrating a configuration example of the program area 401 in the memory 105 of the storage controllers 102 and 112 in the embodiment.

The program area 401 stores a non-stop controller update sequence control unit 501, a process takeover control unit 502, a controller expansion unit 503, a controller reduction unit 504, a control logic switching unit 505, an IO program 506, and a compression/decompression process program 507. All of these elements are programs stored in the memory 105 and executed by the CPU 104.

In the following description, the process executed by each unit described above is actually executed by the CPU 104 according to a program. The program can include, for example, an operating system in addition to these programs. In the present embodiment, the plurality of storage controllers are installed in the storage system, and the hardware of each controller and the programs running on each controller may be different generations of hardware and programs installed in each controller. In order to determine whether the different generations of programs can operate together, each program is assigned with version information of which value is incremented each time the program is updated.

For example, the version information of the compression process program released on Aug. 1, 2021 and the version information of the new compression process program released on Aug. 1, 2022 are assigned with the formats of 10.1.0 and 11.0.0, respectively.

The non-stop controller update sequence control unit 501 controls the sequence of replacement of the storage controller 102 of the present embodiment. The process takeover control unit 502 performs a process of taking over the process control right in units of LUN, the LUN registration of the FE port, and the data stored in the shared memory, from the storage controller 102 of a replacement target to the storage controller 112 of a replacement destination. The controller expansion unit 503 performs the process when expanding the new storage controller 112. The controller reduction unit 504 performs the process when reducing the old storage controller 102.

After the upgrade of the old storage controller 102 is completed and all the storage controllers in the storage system become the new storage controller 112, the control logic switching unit 505 performs a process of switching the control logic to the logic dedicated to the new storage controller 112. The IO program 506 is a program that responds to an IC request issued by the host computer 120.

The compression/decompression process program 507 is a program for performing compression/decompression process on the data written from the host for the purpose of reducing the amount of data. Some programs perform the compression/decompression process only by software using the CPU, while other programs perform the compression/decompression process by using the accelerator circuit installed on the storage controller.

Figure 5:
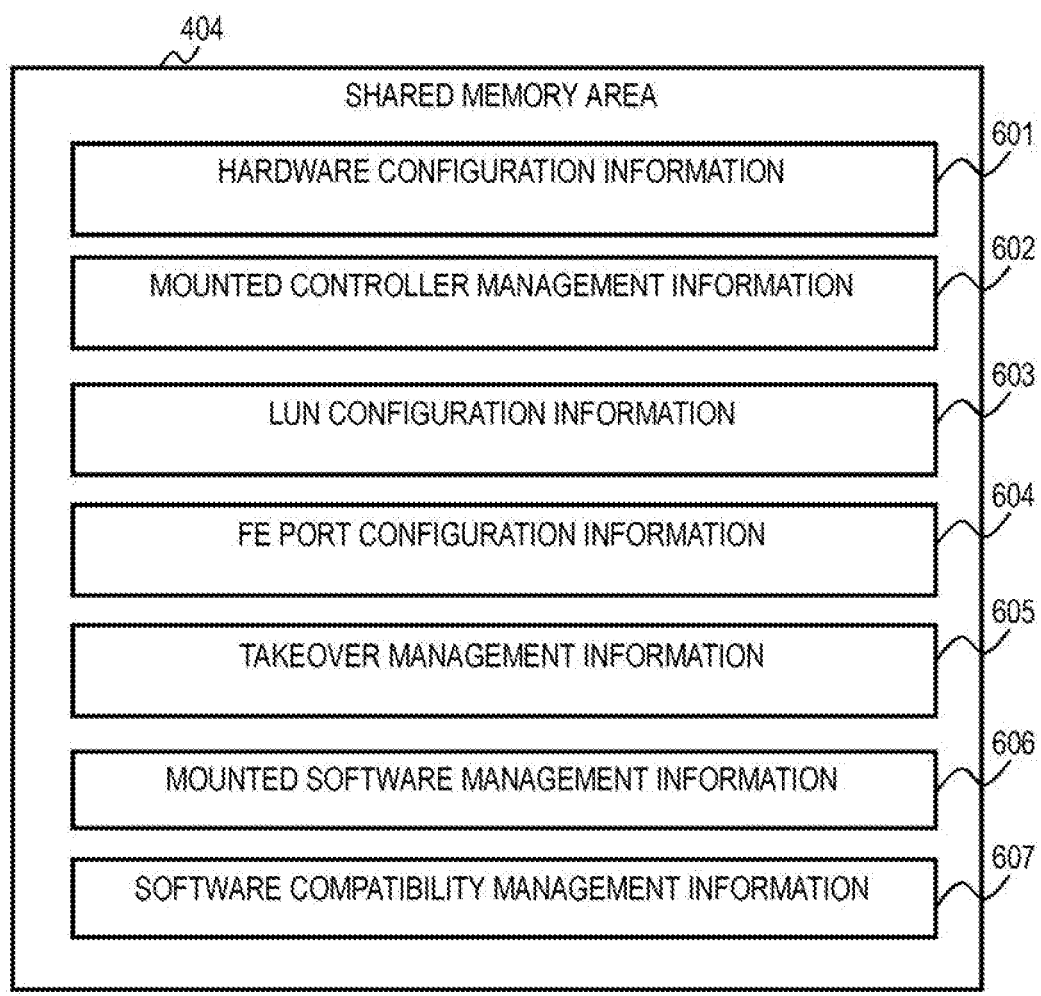
FIG. 5 is an explanatory diagram illustrating a configuration of a shared memory within the memory of the storage controller in the embodiment.

FIG. 5 is an explanatory diagram illustrating the configuration of the shared memory area 404 within the memory 105 of the storage controllers 102 and 112 in the embodiment. The shared memory area 404 stores hardware configuration information 601, mounted controller management information 602, LUN configuration information 603, FE port configuration information 604, takeover management information 605, mounted software management information 606, and software compatibility management information 607.

Details of the hardware configuration information 601 will be described with reference to FIG. 6. The mounted controller management information 602 stores information on the maximum number of controllers that can be mounted in the storage system 100. The LUN configuration information 603 is information indicating the configuration of each logical unit, and one LUN configuration information 603 is stored for one logical unit.

The LUN configuration information 603 includes a LUN ID, a registration-completed FE port ID list, and control right CPU ID. The LUN ID is identification information of each logical unit. The FE port ID list is a list of identification information of FE ports for which a path to each logical unit is set. The control right CPU ID is identification information of the CPU 104 that exclusively accesses the control information related to the I/O processing to each logical unit. The control right CPU ID is a unique ID in the storage system, and can identify the CPU on which the storage controller in the storage system the CPU having the control right of the corresponding LUN is.

Each logical unit is associated with the FE port belonging to different storage controllers for the purpose of load distribution and failover during the failure. The FE port configuration information 604 is information indicating the configuration of each FE port 103. The information manages which LUN ID is allocated to each FE port. Each storage controller 102 stores the FE port configuration information 604 related to all the FE ports that the corresponding storage controller 102 has. The FE port configuration information 604 includes an FE port ID, an FE port address, and a list of LUN IDs allocated to the respective FE ports.

The takeover management information 605 is information indicating a target to be taken over from the old storage controller 102 that is a replacement target to the new storage controller that is a replacement destination. This information is temporarily generated in the upgrade process of the storage controller. The takeover management information 605 includes a reduction target controller ID, LUN control right information, FE port LUN registration information, shared memory storage information, LUN control right transfer destination information, transfer destination LUN registration information for each FE port, and shared memory transfer destination information. The mounted software management information 606 is information for managing version information of software installed in each storage controller in the storage system. Details will be described later with reference to FIG. 9.

The software compatibility management information 607 is information indicating compatibility between versions of each program installed in the storage controller and between controller versions. Details of the software compatibility management information 607 will be described later with reference to FIG. 10.

It is noted that a portion of the software described with reference to FIGS. 4 and 5 may be omitted in one or both of the storage controllers 102 and 112, and other programs or information may be provided in one or both of the storage controllers 102 and 112.

Figure 6:
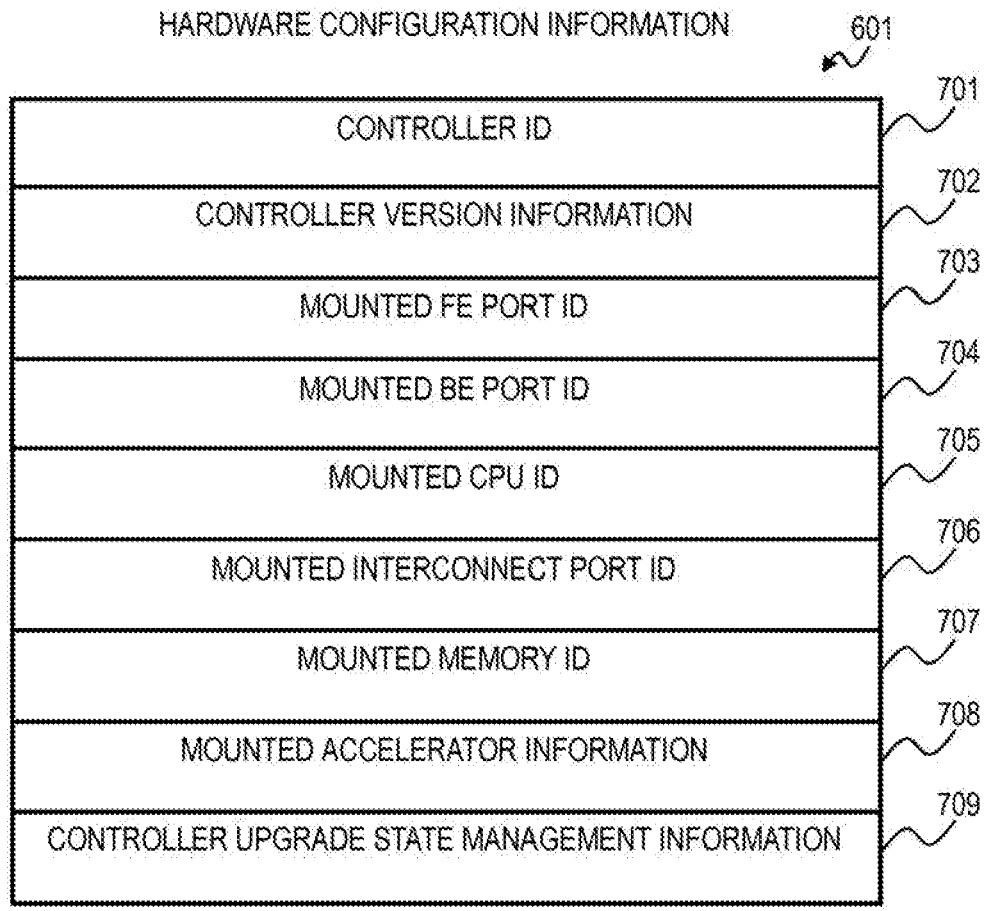
FIG. 6 is an explanatory diagram illustrating a configuration of hardware configuration information stored in the memory of the storage controller in the embodiment.

FIG. 6 is an explanatory diagram illustrating a configuration of the hardware configuration information 601 stored in the memory 105 of the storage controllers 102 and 112 in the embodiment. The hardware configuration information 601 includes a controller ID 701, controller version information 702, program version information 703, a mounted FE port ID 703, a mounted BE port ID 704, a mounted CPU ID 705, a mounted interconnect port ID 706, a mounted memory ID 707, mounted accelerator information 708, and controller upgrade state management information 709.

The controller ID 701 is identification information of each storage controller. IDs are prepared for the maximum number of controllers that can be mounted in the storage system 100. When the new storage controller 102 is added in the storage system 100, an unused controller ID is allocated.

The controller version information 702 is version information of hardware corresponding to the controller ID 701. Accordingly, it can be determined whether each storage controller is the old storage controller or the new storage controller. When the storage controller is unmounted, a value indicating invalidity such as NULL is set.

The mounted FE port ID 703, the mounted BE port ID 704, the mounted CPU ID 705, the mounted interconnect port ID 706, and the mounted memory ID 707 are identification information of the FE port 103, the BE port 106, the CPU 104, the IC port 107, and the memory 105 mounted on each storage controller 102, respectively. The mounted accelerator information 708 is information related to the type of the accelerator circuit 113 mounted in each storage controller 102 or 112.

The controller upgrade state management information 709 is management information for determining whether the storage system 100 is in a normal state where the controller is not being upgraded or is being upgraded and for determining, in a case of being upgraded, which controller ID, which controller version, and which software version the controller is to be upgraded to. Information is set in the storage controller upgrade overall sequences described below so that process can be switched depending on whether the upgrade is in progress.

When the plurality of storage controllers can be mounted in the storage system 100, the hardware configuration information 601 stores tables for the maximum number of the storage controllers that can be mounted.

Figures 7, 8:
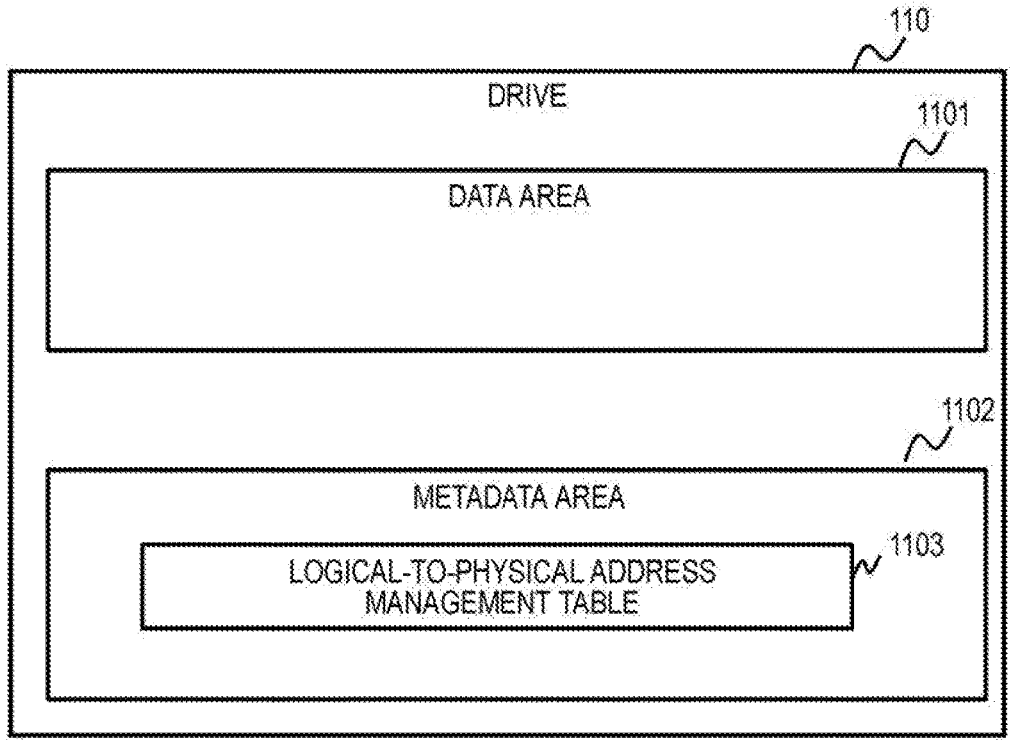
FIG. 7 is an explanatory diagram illustrating a configuration example of a drive in the embodiment.
FIG. 8 is an explanatory diagram illustrating a configuration example of a logical-to-physical address management table in the embodiment.

FIG. 7 illustrates the areas existing on the drive 110 in the embodiment. The drive 110 includes a data area 1101 and a metadata area 1102. The data area 1101 stores the host data received from the host computer 120. As described later, the data area 1101 stores the compressed host data or the uncompressed host data.

The metadata area 1102 stores control data used by the storage controllers in the same node to execute necessary processing in the storage system. FIG. 7 illustrates a logical-to-physical address management table 1103 as an example of the control data. The logical-to-physical address management table 1103 manages mapping information between the logical address space accessed by the host computer 120 and the physical address space in which the host data is stored. The logical-to-physical address management table 1103 is shared between the storage controllers. Details of the logical-to-physical address management table 1103 will be described later.

FIG. 8 illustrates a configuration example of the logical-to-physical address management table 1103. The logical-to-physical address management table 1103 manages address mapping between the logical address space and the physical address space. In the configuration example of FIG. 8, the logical-to-physical address management table 1103 includes a logical address column 11031, a drive number column 11032, a physical address column 11033, a post-compression size column 11034, and an offset column 11035.

The logical address column 11031 indicates a logical address of the logical chunk 511. The drive number column 11032 indicates the number of the drive that provides the storage area allocated to the logical chunk designated by the logical address. The physical address column 11033 indicates the physical address of the physical chunk allocated to the logical chunk designated by the logical address.

The post-compression size column 11034 indicates the data size of the compressed data including the logical chunk data. As described above, the compressed data is generated from the plurality of logical chunks of data, and the data of one logical chunk is a portion of the compressed data. It is noted that the post-compression size column 11034 indicates "uncompressed" for the logical chunks stored in the drive 31 in an uncompressed state. The offset column 11035 indicates the offset of the logical chunk data in the original data of the compressed data, that is, the data obtained by decompressing the compressed data.

FIG. 9 illustrates a configuration example of the mounted software management information 606 in the embodiment. The mounted software management information 606 is management information for grasping which version of software is installed in each storage controller in the storage system. The mounted software management information 606 includes a controller ID 6061, a software type 6062, a software sub-type 6063, and software version information 6064.

The controller ID 6061 is identification information of each storage controller. The controller ID 6061 corresponds to the controller ID 701 stored in the hardware configuration information 601, and thus, the version information of the software mounted in the corresponding controller can be associated with the mounted controller version information 702 by using the controller ID 701 as a key.

The software type 6062 indicates the type of software stored in the program area 401. The software sub-type 6063 is used for a case where more detailed version management is required, such as software (program) that operates only with a specific controller version or later in the software type 6061, or software (program) that does not operate without a specific accelerator circuit. The software version information 6064 is a version number for checking whether there is compatibility with existing functions as a result of adding a new function to the corresponding software or reforming the existing functions.

FIG. 10 illustrates a configuration example of the software compatibility management information 607 in the embodiment. The software compatibility management information 607 is information for determining whether there is compatibility in software (program) that requires cooperation between different the storage controllers. Examples of software that requires cooperation between different the storage controllers include software that requires communication of control information and data between the storage controllers, such as the non-stop controller update sequence control unit 501.

In addition, another example is software that performs a process such as compression or encryption algorithms that has a high CPU processing load and that is not desired to be operated in order to suppress performance degradation when the CPU is not a high-performance CPU with the latest hardware.

The software compatibility management information 607 includes a software type 6071, a software sub-type 6072, software version information 6073, and software compatibility information 6074. The software type 6071 indicates the type of software stored in the program area 401. The software sub-type 6072 is used for a case where more detailed version management is required, such as a case where the operation is performed only with a specific controller version or later in the software type 6071, or a case where the operation is not performed without a specific accelerator circuit among the software types 6071.

The software version information 6073 is a version number for checking whether there is compatibility with existing functions as a result of adding a new function to the corresponding software or reforming existing functions.

The software compatibility information 6074 is information for grasping which hardware has compatibility when the version number of which the certain software type 6071 is the software version information 6073. In other words, the software compatibility information 6074 indicates which hardware can execute each software type. In the present embodiment, three types of the storage controllers are assumed.

A controller version 1 is the storage controller without a compression/decompression accelerator installed, a controller version 2 is the storage controller with a first-generation accelerator installed, and a controller version 3 is the storage controller with a second-generation accelerator installed. In the present example, it is assumed that, in comparison to the first-generation accelerator, the second-generation accelerator is installed with a more advanced compression algorithm, and thus, has a better data compression rate than the first-generation accelerator, and also has better performance than the first-generation accelerator.

In addition, information on the performance is also assigned to each version algorithm. In this example, although the performance influence is expressed as large, middle, and small, a specific processing performance (processing speed) such as 100 MB/s may be expressed as an absolute value, and the number of levels is not limited. Herein, the "small performance influence" indicates an algorithm (program) performed by using the accelerator circuit, and the case where the CPU load is the smallest. The "middle performance influence" indicates an algorithm designed to be processed by software, such as gzip and LZ4.

The "large performance influence" indicates an algorithm that causes a very large CPU load by performing software of a high-level algorithm originally performed by using the accelerator circuit. The algorithms with a large CPU load are basically prepared to read data when the accelerator circuit fails, and the algorithms are not assumed to be used in normal times.

In this figure, the software version information 6073 describes two types of software versions 10.0.0 and 11.0.0. It is assumed that the version 10.0.0 is released at the same time when the controller version 2 is released, and the software version 11.0.0 is released at the same time when the controller version 3 is released.

At this time, referring to the software compatibility management information 607, when the software version information 6073 is 10.0.0, the software compatibility information 6704 of the non-stop controller update sequence control unit 501 indicates that the upgrade to the controller versions 1 to 2 is available. In addition, it can be determined that the upgrade to the controller version 3 is available by upgrading the software version information 6073 to 11.0.0.

Next, the rows of the compression/decompression process program in the software type 6071 will be described. For the compression/decompression process program 507, three types of a software method, an accelerator method 1, and an accelerator method 2 are exemplified. The software method is a compression/decompression algorithm known as gzip, LZ4, and the like, which can be operated only by software. The accelerator method 1 is a method supported by a software version 10.0.0 or later and a controller version 2.

In comparison to the software compression method, the accelerator method 1 can decompress in the small performance influence, in software version 10.0.0 and the controller version 2 with the accelerator installed, but in controller version 1 with no accelerator, data compressed by accelerator method 1 cannot be decompressed by software alone, and there is no data read compatibility between controllers.

Figure 11:
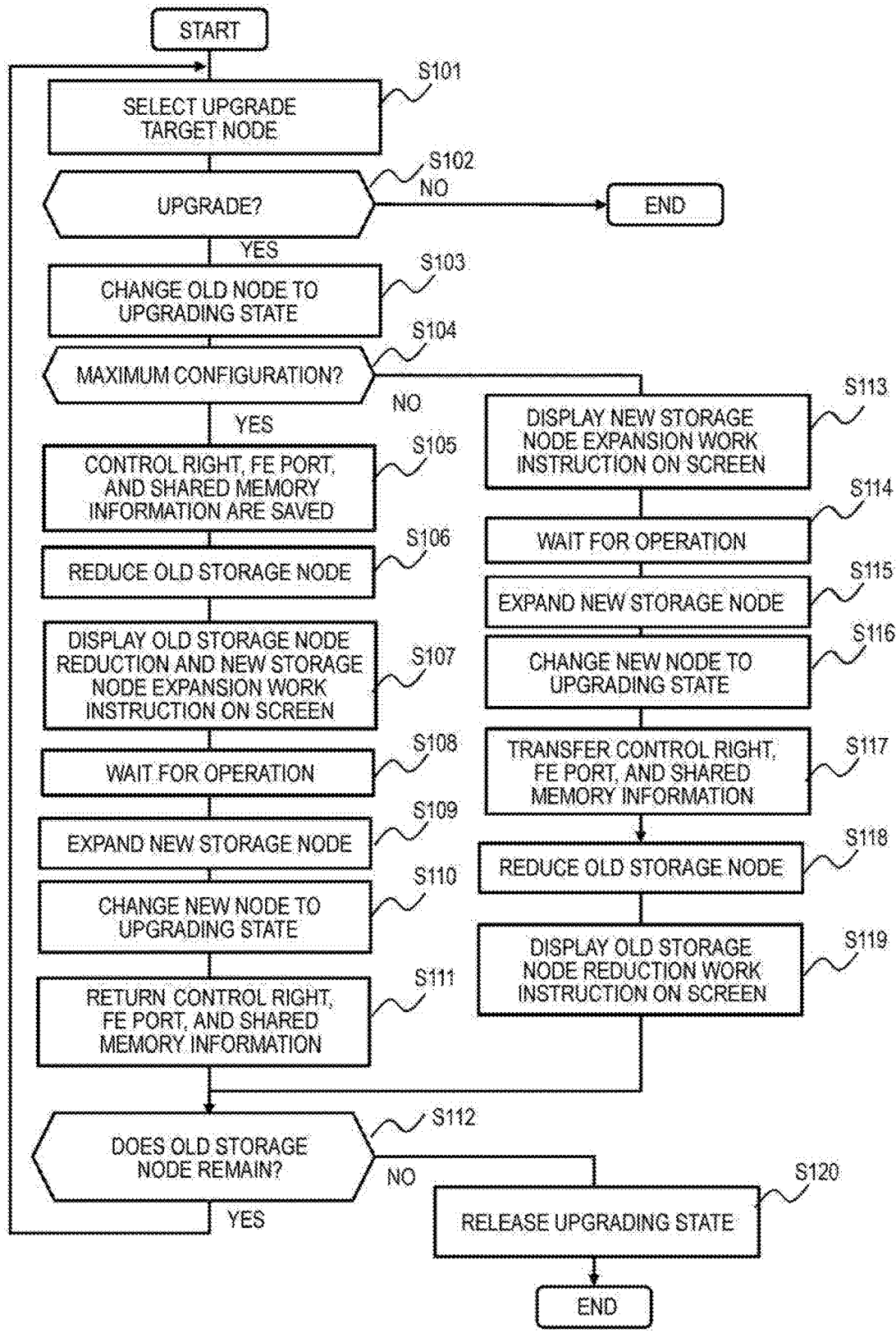
FIG. 11 illustrates a flowchart of an example of a host read process in the embodiment.

FIG. 11 is a flowchart illustrating the overall controller update process executed by the storage controller. In the present embodiment, a process procedure for updating in units of storage nodes is illustrated. The same procedure can be performed even when updating in units of storage controller.

First, the storage controller 102 specifies an upgrade source node (S101). For example, the storage controller 102 receives the designation of the upgrade source node from the management device 122. When the plurality of upgrade source nodes are designated, one upgrade source node is selected from among the upgrade source nodes. The storage controller 102 also receives information on upgrade destination. The information on the upgrade destination includes hardware information and software information of the upgrade destination.

Next, the storage controller 102 determines whether the upgrade is available by referring to the hardware configuration information 601 and software compatibility management information 607. When it is determined that the upgrade is not available (S102: NO), the controller update process is rejected and ended. In order to perform the upgrade, the software version of the node that is an upgrade target needs to be updated to an appropriate version corresponding to the upgrade.

The storage controller 102 obtains the controller version information 702 corresponding to the update source controller ID by referring to the hardware configuration information 601. Next, the controller version and the software version of the non-stop controller update sequence control unit 501 are obtained by referring to the hardware information and software information of the update destination.

Next, by referring to the software compatibility management information 607, the storage controller 102 obtains the entry where the software type 6071 matches the non-stop controller update sequence control unit 501, the software version information 6073 matches the software version installed in the upgrade destination controller, and the software compatibility information 6074 matches the controller version of the upgrade destination controller.

As the obtained result, when the controller upgrade is supported, it is determined that the upgrade is available. In addition, when the content of the entry is N/A (Not Available) or when no entry matching the conditions is found, it is determined that the upgrade is not available.

When it is determined that the upgrade is available (S102: YES), the controller update process is permitted. The storage controller 102 changes the controller upgrade state management information 709 of the hardware configuration information 601 of the upgrade target node from "normal state" to "upgrading" (S103).

Next, the storage controller 102 determines whether the current configuration is the maximum configuration by referring to the mounted controller management information 602 (S104). When it is determined that the configuration is already at the maximum configuration (S104: YES), it is determined that the storage controller is to be upgraded by the procedure of reduction and then expansion, and the process proceeds to S105. In addition, when it is determined that the number of the storage controllers is less than the maximum (S104: NO), it is determined that the storage controller is to be upgraded by the procedure of expansion and then reduction, and the process proceeds to S113.

In S105, the control right of the LUN and the information of the allocation of the FE port of the LUN and the stored shared memory are saved from the storage controller that is a reduction target to other storage controllers 102 and/or 112 that is not a reduction target. The saved information is stored in the takeover management information 605.

Next, the storage controller 102 reduces the old storage node 101 that is a reduction target (S106). Specifically, the controller version information 702 corresponding to the hardware configuration information 601 of the old storage node 101 as the storage system is changed to be unmounted.

Next, in order to prompt the operator to install the apparatuses and the wirings such as the cables, the storage controller 102 displays a reduction work instruction for the old storage node 101 and an expansion work instruction for the new storage node 111 on a management screen (S107), and, then, waits for an operation from the operator (S108). The management screen is, for example, a screen displayed by a display device (not illustrated) of the management device 122.

After receiving the operation from the operator, the storage controller 102 executes the expansion process of the new storage node 111 (S109). Specifically, the storage controller 102 initializes settings of the hardware configuration information 601 corresponding to the new storage controller 112 installed in the new storage node 111. At this time, the storage controller 102 allocates an unused controller ID in the storage system as the controller ID 701 of the new storage controller 112. Accordingly, by referring to the hardware configuration information 601, the storage node controller 102 can detect that the new storage controller 112 is mounted on the storage system.

Next, the storage controller 102 changes the controller upgrade state management information 709 of the hardware configuration information 601 of the expanded new storage node 111 from "normal state" to "upgrading" (S110). By this state change, the storage controller can determine that the corresponding controller is being upgraded.

Next, the storage controller 102 transfers the LUN control right, LUN allocation for each FE port, and the shared memory information stored in the takeover management information 605 in S105 to the new storage controller 112 (S111). Next, the process proceeds to S112.

In S112, the storage controller 102 determines whether the old storage controller 102 remains in the storage system by referring to the controller version information 702 of the hardware configuration information 601 corresponding to all the storage controllers in the storage system. When the old storage controller 102 remains, the process returns to S101. When the replacement with the new storage controller 112 is completed, the process proceeds to S120.

In S120, the storage controller 112 changes the controller upgrade state management information 709 of the hardware configuration information 601 from "upgrading" to "normal state".

Steps S113 to S119 are process procedures for performing the upgrade by expanding and then reducing the storage controller node.

In S113, in order to prompt the operator to install the apparatuses and the wirings such as the cables, the storage controller 102 displays a physical expansion work instruction for the new storage node 111 on the management screen and, then, waits for an operation from the operator (S114).

After receiving the operation from the operator, the storage controller 102 executes the expansion process of the new storage node 111 (S115). Specifically, the storage controller 102 initializes settings of the hardware configuration information 601 corresponding to the new storage controller 112 installed in the new storage node 111. At this time, the storage controller 102 allocates an unused controller ID in the storage system as the controller ID 701 of the new storage controller 112. Accordingly, by referring to the hardware configuration information 601, the storage controller 102 can detect that the new storage controller 112 is mounted on the storage system.

The storage controller 102 changes the controller upgrade state management information 709 of the hardware configuration information 601 of the expanded new storage node 111 from "normal state" to "upgrading" (S116). By this state change, the storage controller can determine that the corresponding controller is being upgraded.

Next, the storage controller 102 transfers LUN control rights registered in the storage controller 102 that is a reduction target and the information on LUN allocation for each FE port and the shared memory arranged on the storage controller 102 that is a reduction target to the new storage controller 112 (S117).

After the transfer is completed, the storage controller 102 reduces the storage node that is a reduction target (S118). Specifically, the controller version information 702 corresponding to the hardware configuration information 601 of the old storage node 101 as the storage system is changed to be unmounted.

Next, the storage controller 102 displays a physical reduction work instruction for the reduced old storage node 101 on the management screen in order to prompt the operator to remove devices and cables (S119). After that, the process proceeds to S112. It is noted that, when receiving the instruction of S119, the operator performs the physical reduction work.

Figure 12:
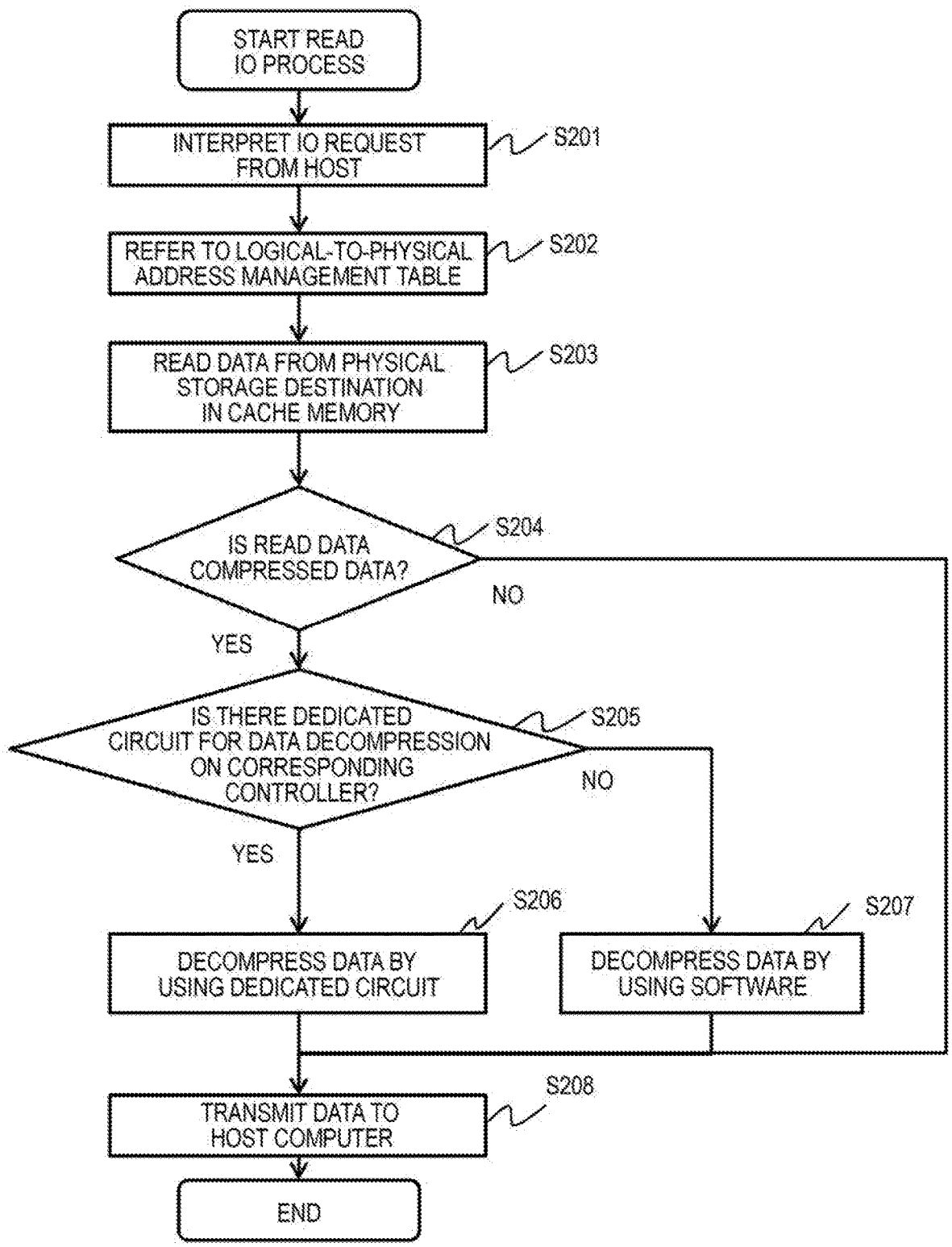
FIG. 12 is a flowchart illustrating a control logic including a control logic switching determination process executed by the storage controller in the embodiment.

FIG. 12 illustrates a flowchart of an example of the host read process in the embodiment. The controller 102 or 112 receives a read request from the host computer 120. The CPU 104 of the corresponding controller 102 or 112 executes the IO program 506. The IO program 506 analyzes the IO request received from the host computer 120, herein, a read request (S201). The read request indicates read request data, and more specifically, indicates the identifier of the logical volume of the access destination, the start logical address of the requested data, and the data length. That is, one or more logical chunks are designated to store the data to be transmitted.

Next, the IO program 506 specifies the drive number and the physical address of the physical chunk corresponding to each designated logical chunk by referring to the logical-to-physical address management table 1103 (S202).

Next, the IO program 506 reads the host data from the drive 110 and stores the host data in the cache memory area 403 of the memory 105 (S203). Specifically, the IO program 506 reads the host data from the physical address obtained from the logical-to-physical address management table 1103.

Next, the IO program 506 determines whether the data read from the drive 110 is compressed data or non-compressed data (S204). The IO program 506 can determine whether the data is compressed data or non-compressed data by referring to the post-compression size column 11034 of the logical-to-physical address management table 1103.

When the read data is compressed data (S204: YES), the IO program 506 determines whether a dedicated circuit (accelerator circuit 113) for data decompression is installed on the corresponding storage controller 102 or 112 (S205). Specifically, it is determined whether a logic for decompressing the read and compressed data is included by referring to the mounted accelerator information 708 of the hardware configuration information 601.

When a dedicated circuit is mounted (S205: YES), the IO program 506 decompresses the data by using the dedicated circuit (S206) and transmits the host data to the host computer (S208).

When the dedicated circuit is not mounted (S205: NO), the IO program 506 decompresses the compressed data by software without using the dedicated circuit (S207) and transfers the host data to the host computer (S208). Normally, although the data compressed by using the accelerator circuit can be decompressed by using the same accelerator circuit, when the accelerator circuit is in failure or when the accelerator circuit is reduced in the meantime, there may be cases where the data compressed by the accelerator needs to be decompressed without using the accelerator circuit.

When the read data is uncompressed data (S204: NO), the IO program 506 transfers the host data to the host computer (S208).

Figure 13:
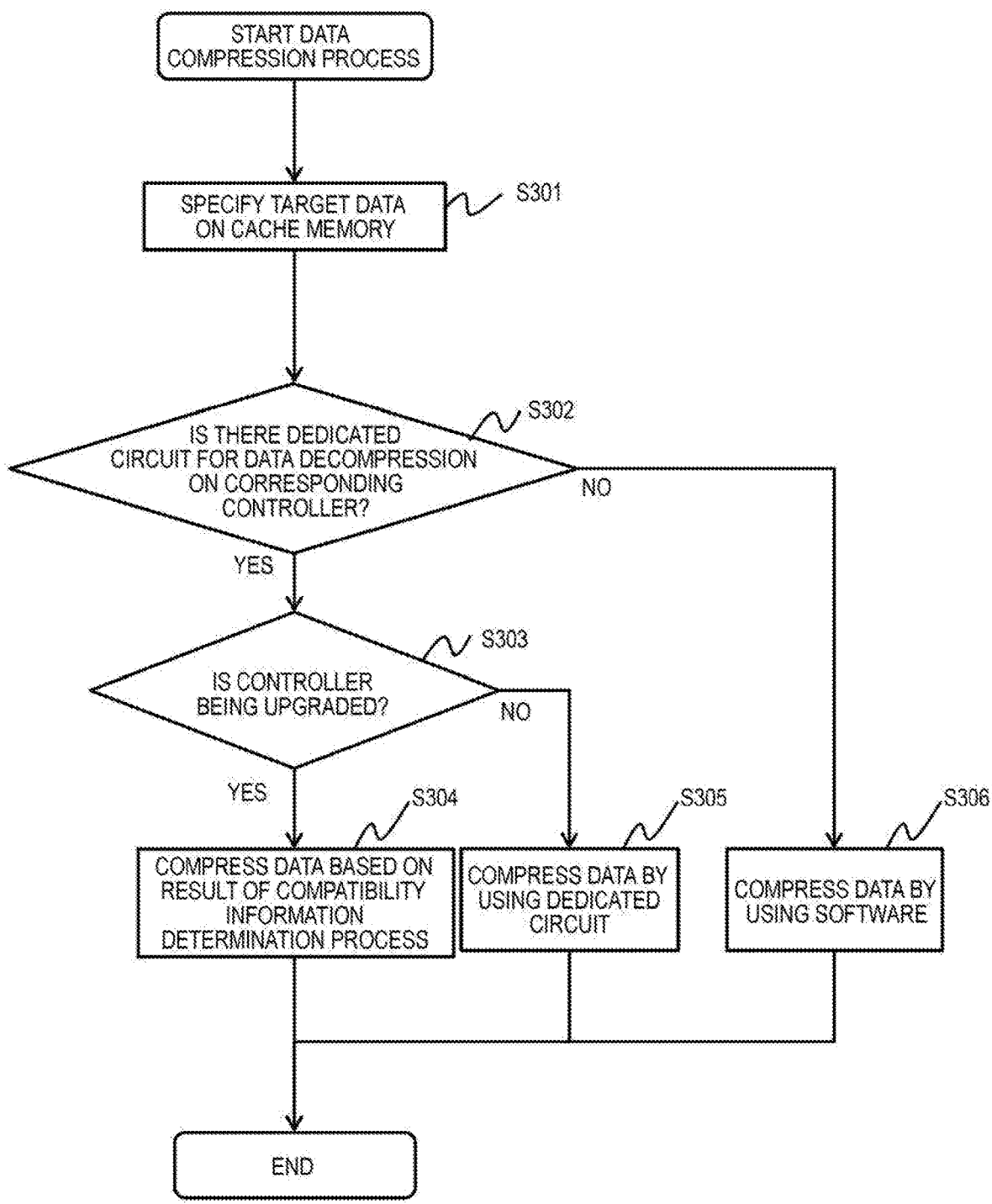
FIG. 13 illustrates a flowchart of an example of a data compression process in the embodiment.

FIG. 13 illustrates a flowchart of an example of a data compression process in the embodiment. The data compression process is performed on data written from the host computer 120 in order to reduce the amount of data stored in the drive 110. Although not illustrated, the sequence until the storage controller 102 or 112 receives the write request from the host computer 120 will be described. First, the storage controller 102 or 112 receives a write request from the host computer 120.

The CPU 104 of the corresponding controller 102 or 112 executes the IO program 506. The IO program 506 stores data received from the host computer 120 in the cache memory area 403. After that, for the purpose of redundancy of data, the data is transferred to the cache memory area 403 on the other storage controller 102 or 112, and the host computer 120 is notified of the completion of the write process.

The compression process described with reference to the drawings may be performed immediately after the data is stored in the cache memory area 403 from the host computer 120, or the compression process may be performed after waiting for a certain amount of data to be accumulated on the cache memory area 403 synchronously with the write request from the host computer. The IO program 506 then performs the compression process and stores the data in the drive 110 after the compression process is completed.

First, the IO program 506 is written from the host computer 120 to specify the data stored in the cache memory area 403 (S301). Specifically, the identifier of the logical volume of the access destination, the start logical address of the write data, and the data length are indicated. That is, one or more logical chunks to store the data to be compressed are designated.

Next, the IO program 506 determines whether a dedicated circuit (accelerator circuit 113) for data compression is installed on the corresponding controller (S302). Specifically, by referring to the mounted accelerator information 708 of the hardware configuration information 601, it is determined whether a logic for compressing the data to be compressed is included.

When the dedicated circuit is not installed (S302: NO), the IO program 506 compresses the data by software without using the dedicated circuit (S306) and ends the data compression process.

When the dedicated circuit is installed (S302: YES), the IO program 506 determines whether the corresponding storage controller 102 or 112 is being upgraded (S303). Specifically, by referring to the controller upgrade state management information 709 of the hardware configuration information 601, it is determined whether the corresponding storage controller 102 or 112 is being upgraded.

When determining not to be upgraded (S303: NO), the IO program 506 compresses the data by using the dedicated circuit (S305) and ends the data compression process. When determining to be upgraded (S303: YES), the IO program 506 calls a compatibility information determination process described later to perform the data compression process based on the result (S304) and ends the data compression process.

Figure 14:
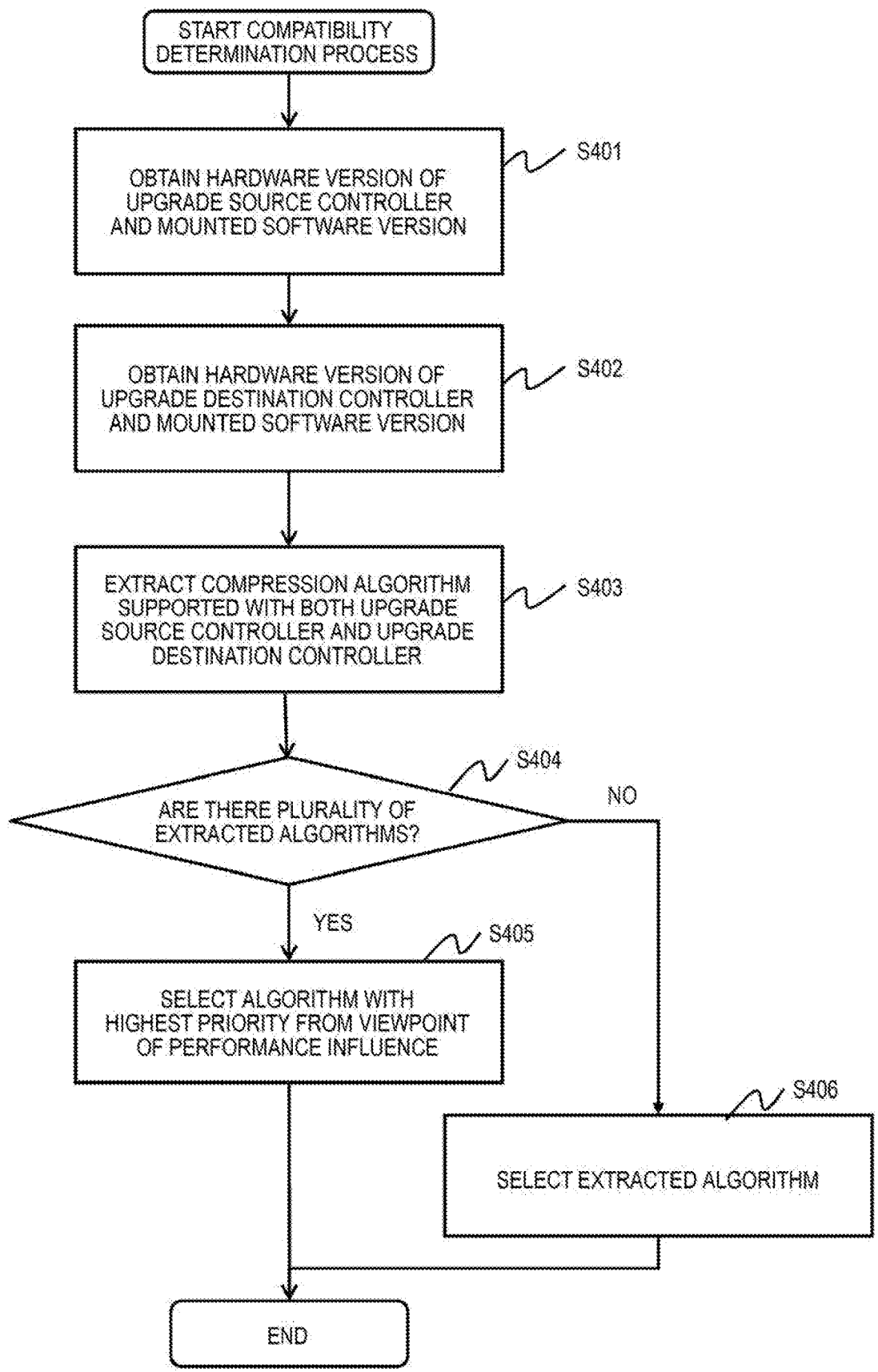
FIG. 14 is a flowchart illustrating a control logic including a compatibility determination process in the embodiment.

FIG. 14 is a flow chart illustrating a control logic including the compatibility determination process executed by the storage controller 102 or 112 in the embodiment.

First, the IO program 506 obtains the version information of its own the storage controller 102 or 112 and the version information of the software mounted in that the storage controller (S401). Specifically, the software version mounted in the storage controller 102 or 112 is specified by referring to the information 6064 in the mounted software management information 606, and the hardware version of the own the storage controller 102 or 112 is specified by referring to the controller version information 702 in the hardware configuration information 601.

Next, the IO program 506 obtains the version information of the upgrade destination storage controller or the upgrade source storage controller and the version information of the software mounted in the storage controller (S402).

Specifically, by referring to the controller upgrade state management information 709, the IO program 506 specifies the storage controller of which controller ID in the storage system the storage controller 102 or 112 is to be upgraded to or the storage controller of which controller ID in the storage system the storage controller 102 or 112 is to be upgraded from. By referring to the hardware configuration information 601 corresponding to the upgrade destination controller ID or the upgrade source controller ID, similarly to S401, the hardware version of the upgrade destination controller or the upgrade source controller and the mounted software version are obtained.

Next, the IO program 506 extracts the compression algorithms supported by both the upgrade source and destination storage controllers (S403). Specifically, in the software compatibility management information 607, by referring to the rows in which the software type 6071 corresponds to the compression/decompression process program and by referring to the columns in which the software compatibility information 6074 corresponds to the upgrade source/destination controller version, the IO program 506 specifies the software sub-type 6072 where both the upgrade source and destination cells are "supported".

When there is only one compression algorithm (software sub-type) satisfying the conditions (S404: NO), the IO program 506 performs the compression by using the compression algorithm (S406). When the plurality of compression algorithms (software sub-types) satisfy the conditions (S404: YES), the IO program 506 selects the compression algorithm with the highest priority from the viewpoint of performance influence and performs the compression process (S405).

In FIG. 10, although the size of the performance influence is expressed as large, middle, and small relative values, a policy may be selected so that the performance influence of the system as a whole becomes small and so that the performance influence of the upgrade source that does not have room for hardware resources such as a CPU becomes small. A compression algorithm with the fastest IO processing speed of the entire storage system is selected.

Specifically, the performance influence of each of the upgrade source and the upgrade destination is in the order of small/small>small/medium>medium/small>medium/ medium>small/large>medium/large>large/small>large/ medium>large/large with respect to the priority. Among the algorithms that satisfy the conditions, the algorithm with the highest priority is selected. The reason for selecting the performance influence of the upgrade source so as to be reduced is that generally by upgrading the controller, by adopting the hardware such as the latest generation CPU, performance improvement can be expected in comparison to before the upgrade. Thus, in one embodiment of the present specification, the priority is set in advance so that the program with the fastest IO processing speed is selected.

Regarding FIG. 10 as an example, when the software version of the upgrade source is 11.0.0 and the controller version is 1 and the software version of the upgrade destination is 11.0.0 and the controller version is 2, the compression/decompression algorithm supported by both the controllers can be specified as the software method 1 and the accelerator method 1.

However, with respect to the accelerator method 1, only the controller version 2 can actually compress and decompress by using the accelerator, the controller version 1 is not installed with the accelerator corresponding to the accelerator method 1, and indicates that the data can be compressed and decompressed by the software only for compatibility although being slow. At this time, when the data is compressed/decompressed by using the algorithm of the accelerator method 1 with the controller version 1, there is a concern that the IC processing performance will be greatly reduced. For this reason, a method of compressing data by using software without using the accelerator circuit is selected.

When the software version of the upgrade source is 11.0.0 and the controller version is 2 and the software version is 11.0.0 of the upgrade destination and the controller version is 3, the compression/decompression algorithm supported by both the controllers can be specified as the software method 1, the accelerator method 1, and the accelerator method 2.

In the accelerator method 1, it is indicated that only the controller version 2 can actually perform the compression and the decompression by using the accelerator, the controller version 3 does not have the accelerator corresponding to the accelerator method 1 and, although being slow only for compatibility, can compress and decompress the data by the software.

In addition, in the accelerator method 2, it is indicated that only the controller version 3 can actually perform the compression and the decompression by using the accelerator, the controller version 2 does not have the accelerator corresponding to the accelerator method 2 and, although being slow only for compatibility, can compress/decompress that data by the software.

Therefore, the data compression method is selected by using the software method 1 without using the accelerator circuit.

In this manner, the performance influence priority is determined so that an accelerator-method-based compression algorithm that can use the accelerator circuits in both the upgrade source and destination storage controllers are preferentially selected. The IO program 506 performs compression with the accelerator-method-based algorithms supported by both the storage controllers. When there is no accelerator-method-based algorithm supported by both the storage controllers, the IO program 506 compresses with the software-method-based algorithm supported by both the storage controllers.

It is noted that the above description related to the selection of the software sub-type (algorithm) for the data compression process can also be applied to the selection of the software sub-type for other processes. As described above, by determining whether the storage controller is being upgraded and selecting the process having a small performance influence of both the storage controllers of the upgrade source and the upgrade destination, before completing the upgrade of all the storage controllers in the storage system 100, it is avoided to perform the process where some new storage controllers 112 that is not compatible with the old storage controllers 102.

In addition, the invention is not limited to the above-described embodiments and includes various modifications. For example, the above-described embodiments have been described in detail in order to describe the invention for the better understanding and are not necessarily limited to those having all the described configurations. In addition, a portion of the configuration of one embodiment can be replaced with the configuration of another embodiment, and the configuration of another embodiment can be added to the configuration of one embodiment. In addition, a portion of the configuration of each embodiment can be added, deleted, or replaced with another configuration.

Further, each of the above-described configurations, functions, processing units, and the like may be implemented by hardware, for example, by designing a portion or all of the above-described configurations, functions, processing units, and the like using an integrated circuit. Moreover, each of the above-described configurations, functions, and the like may be implemented by software by a processor interpreting and executing a program for implementing each function. Information on programs, tables, files, and the like implementing each function can be placed in a memory, a recording device such as a hard disk or an SSD, or a recording medium such as an IC card or an SD card.

In addition, control lines and information lines are indicated to be those considered necessary for description, and thus, not all control lines and information lines are necessarily indicated in terms of products. Actually, it may be considered that almost all configurations are interconnected.

What is claimed is:
1. A storage system comprising:
a plurality of storage controllers, each including a processor and a memory and processing data input to and output from a storage drive,
wherein each of the plurality of storage controllers is an old storage controller before replacement or a new storage controller after replacement,
wherein the new storage controller is configured to execute a first program and a second program,
wherein the old storage controller is configured to execute at least the second program,
wherein, when all of the plurality of storage controllers are the new storage controller, the new storage controller processes the data input to and output from the storage drive by using the first program,
wherein, when the plurality of storage controllers include at least one of the old storage controllers, each storage controller of the plurality of storage controllers processes the data input to and output from the storage drive by using the second program,
wherein the new storage controller includes an accelerator circuit,
wherein the processor of the new storage controller compresses the data by using the accelerator circuit according to the first program, and
wherein the processor of the new storage controller compresses the data without using the accelerator circuit according to the second program.
2. The storage system according to claim 1,
wherein the old storage controller includes a first accelerator circuit,
wherein, before being a replacement target, the old storage controller compresses the data by using the first accelerator circuit, and
wherein, after being the replacement target, the old storage controller compresses the data by the processor of the old storage controller without using the first accelerator circuit.
3. The storage system according to claim 1,
wherein the old storage controller is configured to execute a third program,
wherein the new storage controller includes an accelerator circuit that compresses the data according to a first algorithm,
wherein the first program compresses the data by using the accelerator circuit,
wherein the second program compresses the data without using the accelerator circuit,
wherein the third program is configured to compress the data with the first algorithm by the processor without using a dedicated circuit, and
wherein a priority of a combination of the third program executed by the old storage controller and the first program executed by the new storage controller is lower than a priority of the second program executed by both the old storage controller and the new storage controller.

4. The storage system according to claim 1,
wherein, when there are a plurality of programs that can be executed by both the old storage controller and the new storage controller, the second program is selected from the plurality of programs according to priority set in advance.

5. The storage system according to claim 1, wherein, when there are a plurality of programs that are configured to be executed by both the old storage controller and the new storage controller, a program with the highest IO processing speed is selected as the second program from the plurality of programs.

6. The storage system according to claim 1,
wherein one storage controller of the plurality of storage controllers refers to hardware configuration information and software configuration information of a replacement source storage controller and a replacement destination storage controller, and rejects replacement of the replacement source storage controller and the replacement destination storage controller when the hardware configuration information and the software configuration information do not meet a replacement condition set in advance.

7. A data processing method in a storage system,
the storage system including a plurality of storage controllers that each include a processor and a memory and process data input to and output from a storage drive,
each controller of the plurality of storage controllers being an old storage controller before replacement or a new storage controller after replacement,
the new storage controller being capable of executing a first program and a second program, and
the old storage controller being capable of executing at least the second program, the data processing method comprising:
allowing the new storage controller to process data input to and output from the storage drive by using the first program, when all of the plurality of storage controllers are the new storage controller; and
allowing each storage controller of the plurality of storage controllers to process the data input to and output from the storage drive by using the second program, when the plurality of storage controllers include at least one of the old storage controllers,
wherein the new storage controller includes an accelerator circuit,
wherein the processor of the new storage controller compresses the data by using the accelerator circuit according to the first program, and
wherein the processor of the new storage controller compresses the data without using the accelerator circuit according to the second program.

* * * * *